US008693942B1

(12) United States Patent
Miele

(10) Patent No.: US 8,693,942 B1
(45) Date of Patent: Apr. 8, 2014

(54) METHOD AND APPARATUS FOR EVALUATING EDUCATIONAL PERFORMANCE

(76) Inventor: Frank R. Miele, Forney, TX (US)

( * ) Notice: Subject to any disclaimer, the term of this patent is extended or adjusted under 35 U.S.C. 154(b) by 3129 days.

(21) Appl. No.: 10/924,514

(22) Filed: Aug. 23, 2004

Related U.S. Application Data

(62) Division of application No. 10/140,955, filed on May 7, 2002, now Pat. No. 7,286,793.

(60) Provisional application No. 60/289,602, filed on May 7, 2001.

(51) Int. Cl.
*G09B 3/00* (2006.01)

(52) U.S. Cl.
USPC .......................................... 434/350

(58) Field of Classification Search
USPC ........................................ 434/322, 350, 323
See application file for complete search history.

(56) References Cited

U.S. PATENT DOCUMENTS

| 5,002,491 | A | | 3/1991 | Abrahamson et al. |
| 5,035,625 | A | | 7/1991 | Munson et al. |
| 5,211,563 | A | * | 5/1993 | Haga et al. .................... 434/322 |
| 5,218,537 | A | | 6/1993 | Hemphill et al. |
| 5,421,730 | A | | 6/1995 | Lasker, III et al. |
| 5,586,889 | A | | 12/1996 | Goodman |
| 5,618,182 | A | | 4/1997 | Thomas |
| 5,779,486 | A | | 7/1998 | Ho et al. |
| 5,885,087 | A | | 3/1999 | Thomas |
| 5,934,909 | A | * | 8/1999 | Ho et al. ...................... 434/362 |
| 5,947,747 | A | * | 9/1999 | Walker et al. ................. 434/354 |
| 5,954,510 | A | | 9/1999 | Merrill et al. |
| 6,015,297 | A | | 1/2000 | Liberman |
| 6,086,382 | A | | 7/2000 | Thomas |
| 6,118,973 | A | | 9/2000 | Ho et al. |
| 6,144,838 | A | | 11/2000 | Sheehan |
| 6,210,171 | B1 | | 4/2001 | Epstein et al. |
| 6,301,571 | B1 | | 10/2001 | Tatsuoka |
| 6,361,322 | B1 | | 3/2002 | Linden Henry |
| 6,364,667 | B1 | | 4/2002 | Heinberg et al. |
| 6,461,166 | B1 | | 10/2002 | Berman |
| 6,519,445 | B2 | | 2/2003 | Casey-Cholakis et al. |
| 6,606,480 | B1 | | 8/2003 | L'Allier et al. |
| 6,634,887 | B1 | * | 10/2003 | Heffernan et al. ............ 434/322 |
| 6,685,482 | B2 | | 2/2004 | Hopp et al. |
| 6,688,889 | B2 | | 2/2004 | Wallace et al. |
| 2002/0168621 | A1 | | 11/2002 | Cook et al. |

\* cited by examiner

*Primary Examiner* — Robert J Utama
(74) *Attorney, Agent, or Firm* — Gazdzinski & Associates, PC

(57) ABSTRACT

An improved method and apparatus for evaluating the performance of an individual. In one aspect, the invention includes a method of encoding questions used in an examination in order to accurately identify and evaluate deficiencies in an individual's knowledge. In another aspect, an improved method of evaluating responses to the encoded questions is disclosed. Adaptive structuring of subsequent exam questions and/or topics is also provided. A computer program and associated apparatus for administering and evaluating performance is also described.

17 Claims, 35 Drawing Sheets

REASONING?

I CHOSE ANSWER ___ BECAUSE:

1. REASONING #1
2. REASONING #2
3. REASONING #3
4. NONE OF THE ABOVE (CLICK TO SELECT)

FIG. 1c

Display - Holds images and text

Motion - Allows images and text to the moved on-screen

Erase - Used to remove images and text

Wait - Makes it possible to pause the program

Navigate - Allows program to move from one point to another

Framework - Holds maps of information in sequence

Decision - Helps the program decide where to take the user

Interaction - Helps to set up different user interation points

Calculation - Holds written code for program functions

Map - Holds groups of icons. Provides sub flow-lines.

Digital Movie - Enables the inclusion of AVI movies

Sound - Enables the inclusion of sound effects

Video - Not Used in current file. Used mainly for laserdiscs.

FIG. 4z

METHOD AND APPARATUS FOR EVALUATING EDUCATIONAL PERFORMANCE

This application is a divisional application of U.S. patent application Ser. No. 10/140,955 filed May 7, 2002 now U.S. Pat. No. 7,286,793 of the same title, incorporated herein by reference in its entirety, which claims priority benefit to U.S. provisional patent application Ser. No. 60/289,602 filed May 7, 2001 and entitled "Method And Apparatus For Evaluating Educational Performance," also incorporated herein by reference in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to instructional and testing technology, and specifically to methods and apparatus for more accurately, flexibly, and completely analyzing the knowledge of one or more individuals and enhancing the future performance thereof.

2. Description of Related Technology

The societal benefits of accurately evaluating the knowledge or skill level of one or more individuals are manifold and well known. Several prior approaches to evaluating an individual's knowledge or skill exist. These approaches generally include: (i) multiple choice questions; (ii) true/false questions; (iii) short answer or "fill-in-the-blank" questions; (iv) essay or "free-form" answer questions; (v) real world or practical problem solving; or (vi) personal interview. Of these approaches, multiple choice, true-false, and short-answer questions comprise the great majority of components in modern testing instruments, due to inter alia their ease of administration, relative lack of subjectivity, and comparatively short length.

However, multiple choice, true-false, and short-answer questions are often not highly probative of deficiencies in an individual's knowledge or skill level. Specifically, prior art multiple choice, etc. exams often yield little more information than whether or not an individual has enough knowledge, or guessed adequately, so as to have met the minimum requirements associated with the exam (e.g., provided a sufficient percentage of correct responses in relation to the total number of questions asked). Other prior art exam techniques monitor the time taken to respond to a question, utilizing this information as some indicia of performance.

Furthermore, prior art techniques often are not adaptive to particular individuals or groups; i.e., the techniques do not themselves "learn" about an individual's (or group's) deficiencies and tailor their subsequent operation so as to enhance the testing and learning experience for the individual/group.

The following are generally representative of various prior art testing and evaluation approaches.

U.S. Pat. No. 6,364,667 entitled "Techniques for mastering a body of knowledge by writing questions about the body of knowledge" to Heinberg, et al ("Heinberg") has the individual write questions for a test that is given to a group of test takers. The results of the test are then analyzed to determine how well the person's questions discriminated between those who did well on the test and those who did poorly. A cycle of study, writing questions, analyzing the results, and determining mastery is repeated until the desired degree of mastery is reached. The techniques of Heinberg, however, are directed to test validation (i.e., how well the test/question discriminates between those who have varying degrees of mastery of the subject matter), and not on the evaluation of the individual's skill level or attributes/weaknesses.

U.S. Pat. No. 6,361,322 entitled "System and method for improving a user's performance on reading tests" to Linden Henry ("Henry") discloses a method of teaching reading comprehension which includes presenting a reading passage to a user, asking the user a question relating to the reading passage, and receiving an answer from the user. The method indicates to the user that the answer is an incorrect type of answer to the question if the question tests the user's ability to identify information from the passage and the answer uses information that is not from the passage. Also, the method indicates to the user that the answer is an incorrect type of answer to the question if the question tests the user's ability to infer a conclusion from the passage and the answer uses specific information from the passage. The invention of Henry, however, is geared only to reading comprehension evaluation, and utilizes a specific answer structure related to the material in the reading passage provided. No mechanisms or techniques for accurately evaluating an individual's knowledge level of particular subject matter and adaptively probing the individual for areas of weakness are disclosed.

U.S. Pat. No. 6,210,171 entitled "Method and apparatus for multiple choice testing system with immediate feedback for correctness of response" to Epstein, et al ("Epstein") discloses an answer form for use in answering multiple-choice questions which is configured to provide immediate feedback to an examinee as to whether a correct response has been made for each question, and if not, permits the examinee to proceed to determine the correct response. The answer form includes a substrate such as a paper surface upon which is printed a varying number of rows and columns of answer alternatives. The rows correspond to the questions to be answered, and the columns correspond to the number of answer alternatives for each question. Each alternative is covered by an opaque coating that can be rubbed off to reveal whether a particular alternative conceals an indication that the alternative is correct or not. A blank space beneath the opaque coating indicates an incorrect alternative. The invention of Epstein, however, provides no adaptive or interactive evaluation of the student's knowledge level, but rather merely provides immediate feedback of the correctness or error of the student's answers. Furthermore, Epstein's invention requires manual intervention by the student, thereby disrupting the examination process. Furthermore, positive or negative reinforcement of the student's performance is necessarily provided when the student reviews the correctness of his/her answers, thereby potential introducing additional variables into the evaluation process, and potentially distorting the results (i.e., if the student knows they are performing poorly, they may become stressed and perform even more poorly due to the stress, thereby distorting any determination of their actual skill/knowledge level).

U.S. Pat. No. 5,779,486 entitled "Methods and apparatus to assess and enhance a student's understanding in a subject" to Ho, et al ("Ho") discloses an educational method and system that generates individually-tailored tests based on (and whose difficulties are geared towards) the student's level of understanding in the subject. One goal of Ho is to allow the student not only to use the tests to prepare for an examination, but also to use the tests to learn the subject. The invention disclosed in Ho includes a score generator that is coupled to a recommendation generator. The recommendation generator includes an inference engine and/or a pre-requisite analyzer. Both the pre-requisite analyzer and the inference engine in the recommendation generator can generate recommendations based on the student's test results. The recommendation generator is coupled to a report generator and a question generator. The report generator accesses a report format. Based on the recommendations and the report format, the report generator generates a report, which can provide assessment of the student's understanding in different areas of the subject, and which can provide action items to improve on the student's understanding in the subject. The question generator, based on the recommendations, generates a number of questions. The student can take this new set of questions to further enhance their understanding in the subject. The invention of Ho, however, does not facilitate accurate and adaptive analysis of individual question subject matter and types. Ho discloses only comparatively simplistic grading and weighting routines and inference generation based on so-called "expert" analysis.

Based on the foregoing, there is needed improved methodologies and apparatus for encoding exam questions or problems, and testing/evaluating the skill or knowledge level of subjects. Such improved methodology and apparatus would ideally allow for probative, real-time, non-intrusive, and detailed evaluation and analysis of an individual's skill or knowledge level in one or more topics, as well as adaptive structuring of subsequent examination material based on the aforementioned evaluation and analysis. Such improved methodology and apparatus would also ideally be implemented in a medium which facilitates easy (and repeated) use by anywhere from one to a multitude of individuals disposed at one or more geographic locations.

SUMMARY OF THE INVENTION

The present invention satisfies the aforementioned needs by an improved method and apparatus for evaluating educational performance.

In a first aspect of the invention, an improved method of encoding one or more questions or problems is disclosed. The method generally comprises providing a question relating to at least one topic; encoding the at least one question using a first parameter, the first parameter being related to a first area of the at least one topic; and encoding the at least one question using at least a second parameter, the second parameter being related to a second area of the at least one topic. In one exemplary embodiment, the method comprises encoding one or more examination questions using five parameters, including (i) primary topic category; (ii) primary topic sub-category; (iii) secondary topic category; (iv) secondary topic sub-category; and (v) question type classification. A multi-digit code (each digit corresponding to respective ones of the aforementioned parameters) is assigned to each question, whereby the value of each digit represents a particular type or category of parameter. An algorithm (described below) is used to analyze the responses to each encoded question and develop statistics indicative of the individual's performance in the various topic areas and question types. In a second embodiment, the aforementioned parametric encoding is supplemented with additional parametric information relating to the administration of the question or examination as a whole, including the amount of time taken in responding to each question, the amount of time re-reviewing (i.e., "second looking") each question, the number of times each response is changed, the number of "right-to-wrong" answer changes, the number of "wrong-to-right" answer changes, the number of "wrong-to-wrong" changes, the sequence of the various question types presented to the individual(s), and the like. Statistics may also be dynamically calculated for the individual(s) during the examination, such as to apprise the individual(s) of their performance as a function of time during the course of the examination.

In a second aspect of the invention, an improved method of evaluating the skill or knowledge level of one or more individuals is disclosed. The method generally comprises providing a plurality of questions, at least a portion of the questions being encoded using a plurality of parameters as previously described; administering the plurality of questions to at least one individual; receiving responses to at least a portion of the questions from the individual(s); and evaluating the performance of the individual(s) based on the responses and the encodings of the associated questions. In one exemplary embodiment, the questions comprise multiple choice type questions aggregated to form a multiple choice examination, each of the questions having a five-parameter encoding as previously described. The examination is administered to the individual(s), and their responses received (including the other related data such as the time taken responding to each question, time re-reviewing, number of right-to-wrong answer changes, etc.) and evaluated using an algorithm adapted to analyze the encodings and related data and generate statistics or other information useful for detailed and topic-specific evaluation of the performance of the individual(s). Analysis and statistics may also be generated for multiple individuals or groups of individuals, the latter being related by one or more attributes (such as common employer, educational background, age, race, etc.).

In a third aspect of the invention, an improved evaluation tool structure is disclosed. In one exemplary embodiment, the evaluation tool comprises a computer-driven program adapted to generate examination questions relating to one or more areas of knowledge, receive responses from one or more individuals being evaluated, and evaluate these responses for various parameters of interest. The computer program is further optionally adapted to analyze the responses of the individual(s) in real time and generate follow-on questions based on the statistics generated by the program during response evaluation. For example, where the program detects (based on the generated statistics) a weakness in a particular topic, sub-topic, or question type, it will adaptively alter the question/topic mix and/or sequencing so as to present the individual(s) with a predetermined (or dynamically determined) pattern of questions.

In a fourth aspect of the invention, an improved computer program for implementing the aforementioned methods of encoding and/or evaluation is disclosed. In one exemplary embodiment, the computer program comprises an object code representation of a Authorware source code listing, the object code representation is disposed on the storage device of a microcomputer system and is adapted to run on the microprocessor of the microcomputer system. The computer program further comprises a graphical user interface (GUI) operatively coupled to the display and input device of the microcomputer. One or more subroutines or algorithms for implementing the evaluation methodology described herein based on parametric data provided to the microcomputer are included within the program. In a second exemplary embodiment, the computer program comprises an instruction set disposed within the storage device (such as the embedded program memory) of a digital processor associated with portable evaluation apparatus.

In a fifth aspect of the invention, an improved apparatus for evaluating data obtained according to the foregoing methods and utilizing the aforementioned computer program is disclosed. In one exemplary embodiment, the apparatus comprises a microcomputer having a processor, non-volatile storage device, random access memory, input device, display device, and serial/parallel data ports operatively coupled to one or more sensing devices. Data obtained from an individual under analysis is input to the microcomputer via an input device (such as mouse, keyboard, touch-screen, ocular system, joystick, and/or voice recognition unit); the object code representation of the computer program stored on the storage device is loaded into the random access memory of the microcomputer and executed on the processor as required to analyze the input data in conjunction with commands input by the user via the input device.

In a sixth aspect of the invention, an improved method of educating or training an individual using the aforementioned method is disclosed. The method generally comprises administering a sequence of encoded questions to the individual(s) as previously described herein; evaluating the performance of the individual(s) using the responses to the encoded sequences of questions; identifying at least one area of weakness or potential improvement within the individual(s); generating a training plan based on the at least one area of weakness; and administering the training plan to the individual(s) in order to increase their level of performance.

BRIEF DESCRIPTION OF THE DRAWINGS

The features, objectives, and advantages of the invention will become more apparent from the detailed description set forth below when taken in conjunction with the drawings, wherein:

FIG. 1c is a graphical representation of one exemplary embodiment of the answer reasoning menu displayed to the examinee during operation of the computer program of the invention.

DETAILED DESCRIPTION OF THE PREFERRED EMBODIMENT

Figure 1:
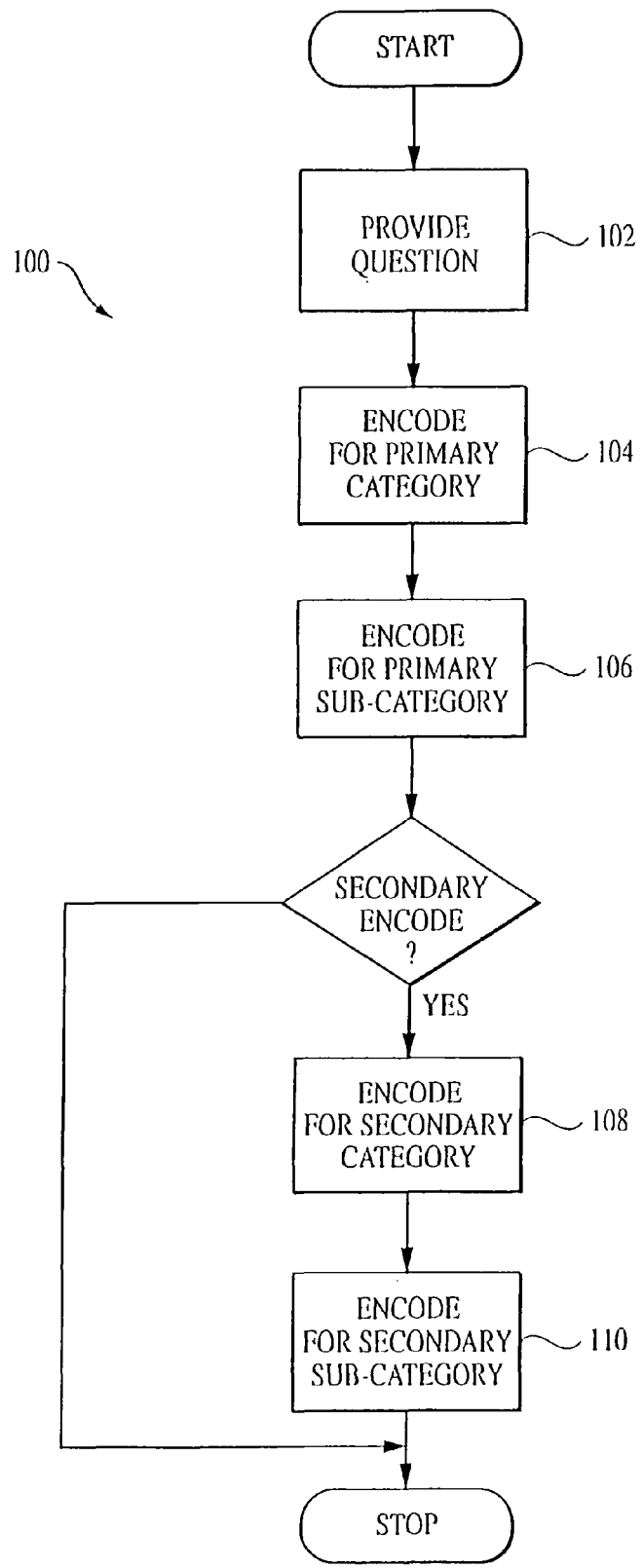
FIG. 1 is a logical flow diagram of one exemplary embodiment of the method of encoding questions according to the present invention.

Reference is now made to the drawings wherein like numerals refer to like parts throughout.

It is noted that while the following description is cast primarily in terms of a program adapted for use on a computer or other digital processing device of the type described below, the fundamental methods of the invention may be readily applied to non-electronic uses including, for example, manual or hand evaluation. Accordingly, the following discussion of the electronic embodiments is merely exemplary of the broader concepts.

As used herein, the term "examination" refers to any type of venue, device, or methodology for assessing the knowledge level or other performance characteristic of an individual, multiple individuals, or groups/subsets of individuals.

As used herein, the term "question" refers to any mechanism used as part of the aforementioned examination to evaluate the knowledge level or other performance characteristic of an individual, multiple individuals, or groups of individuals with respect to one or more topical areas of interest including, for example, multiple choice questions, problems, timed responses, regardless of the medium used to convey such information.

Furthermore, as used herein the terms "education" and "educational" refer broadly to any type of skill set, knowledge level, or other type of attribute which can be learned or assimilated by the foregoing individual(s) or groups of individuals.

As used herein, the term "individual" is meant to include (i) a single individual; (ii) a plurality of individuals unrelated by any particular attribute or characteristic; (iii) a plurality of individuals having at least one related attribute or characteristic; and (iv) a plurality of groups comprising two or more individuals having at least one related attribute, regardless of the relationship of the individuals of one group (if any) to the other group(s). This definition is also intended to be unrestricted in a temporal sense; i.e., depending on the circumstances of the testing, the testing of a single individual at two or more points in time may comprise the testing of one individual, or alternatively may be considered to comprise testing of two different "individuals".

As used herein, the term "computer" refers broadly to any type of digital computing or processing device(s) including, without limitation, microcomputers, minicomputers, laptops, hand-held computers, personal digital assistants (PDAs), organizers, cellular or satellite-based telephones, pagers, and any other device or collection of devices capable of running a computer program thereon.

As used herein, the term "computer program" refers to any algorithm or sequence of machine-related instructions (regardless of whether rendered or embodied in source or object code) adapted to perform a particular purpose. Such computer programs may be of any architecture including, for example, stand-alone applications, distributed applications and object-oriented architectures (e.g., CORBA), or other networked applications, and may be stored in any device including, without limitation, embedded storage, random access memory, hard disk, read-only memory, static memory, optical disc, DVD, smart card, or magnetic bubble memory.

As used herein, the term "question type" is used generally to refer to the primary cognitive skills or functions required in analyzing or answering the question. For example, one type of question might relate to definitions and memorization, while another involves the complex inter-relationship of multiple principles. Conversely, the term "question format" refers to the structure or architecture of a particular question or set of questions, including for example multiple choice, short answer, essay, graphical interface, etc.

Discussion

The current invention advantageously provides an examination structure with the ability to more completely analyze an individual's knowledge, and/or the knowledge level of multiple individuals or groupings of individuals as compared to the prior art techniques previously described herein. It improves upon the more simplistic prior art examination approaches by analyzing many aspects of an individual's knowledge for one or more given topics, in addition to determining whether or not they answered specific questions right or wrong, the time taken to respond, etc. The invention in one aspect provides a pattern recognition and analysis algorithm specifically adapted to determine the subject matter areas of strength and weakness in the individual based on parametric encodings of the questions posed to that individual. Problematic types or forms of questions (e.g., long fact pattern type questions requiring the practical application of knowledge) may also be identified and diagnosed. The present invention also aids in accurately assessing and verifying student knowledge level, thereby overcoming disabilities associated with prior art methodologies which are prone to frustration such as by "teaching to the test", wherein testing skills are emphasized more heavily than actual, practical knowledge of the subject matter.

Figure 1A:
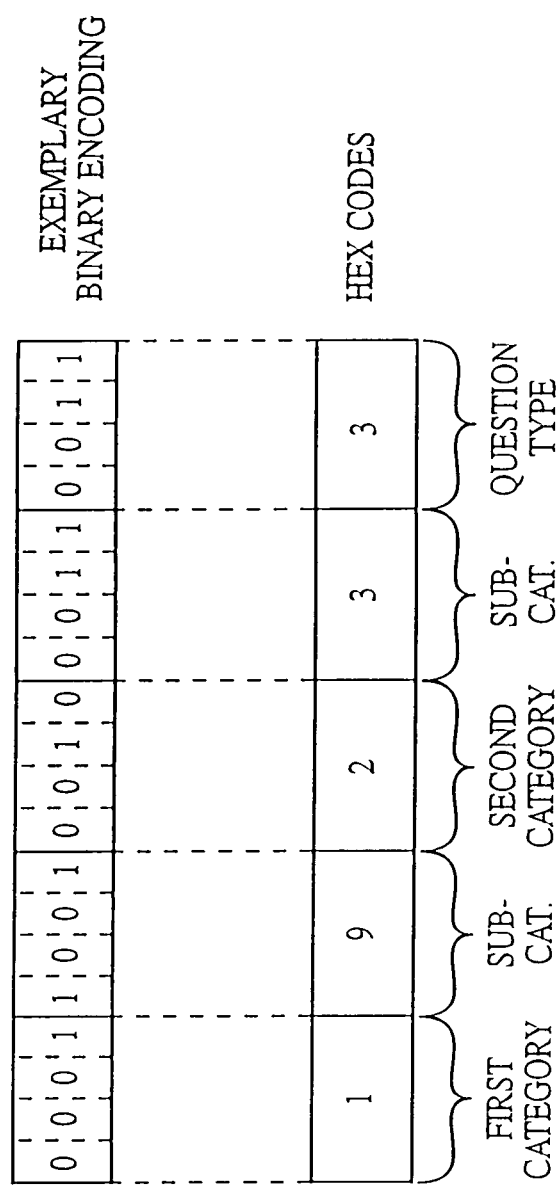
FIG. 1a is a graphical representation of one exemplary question encoding scheme according to the invention.

FIGS. 1 and 1a (and Appendix I) illustrate one embodiment of the methodology of encoding the questions according to the invention. This methodology 100 utilizes an encoding scheme 150 in which a 5-digit hexadecimal code is assigned to each question. As used herein, the term "digit" refers broadly to any parameter or character capable of representing information. For example, the "digits" of the embodiment of FIGS. 1 and 1a may include binary digital (i.e., base 2) representations of the hexadecimal encodings of Appendix I, although it will be recognized that other approaches may be used, either in the alternative or in combination with those discussed herein.

As shown in FIG. 1, the method 100 comprises first providing a question relating to at least one topic (or multiple topics, if desired) per step 102. As exemplified in Appendix I, the question may comprise any number of different formats and types including, for example, multiple choice involving definitions and memorization, multiple choice involving relating multiple concepts together, etc. Next, per steps 104 and 106, the question is encoded using a first parameter [ix] representative of the primary or principal topic category (e.g., hexadecimal "1" for math, per Appendix I) and second parameter [jx] for the associated sub-category (e.g., hex "9" for trigonometry), respectively. In steps 108 and 110, the secondary category and sub-category parameters [kx] and [lx] are encoded (e.g., hex "2" for waves, and hex "3" for frequency/period. Lastly, in step 112, the question type is encoded (e.g., hex "3" for calculations based on equations and mathematical relationships. FIG. 1a illustrates this hexadecimal encoding scheme, and an exemplary binary digital representation thereof.

It will further be appreciated that the number of digits in the encoding can be varied depending on the level of analysis and granularity desired. For example, seven-digit encodings may be used, wherein in addition to the category/sub-category and question type information, additional digits representative of the question format (e.g., multiple choice, etc.), relative level of subject matter difficulty and language difficulty are included. The latter "digit" may contain information indicative of the relative obscurity or level of difficulty of the language in which the question is rendered, which may be useful for diagnosing instances where an individual has difficulty during testing based more on their deficient command of the language as opposed to any lack of understanding of the base subject matter, such as with foreign exchange students who may only recently have learned the relevant language. Additional categories/sub-categories may also be appended to the encoding (e.g., by adding a tertiary category/subcategory encoding to the aforementioned principal and secondary category/subcategory encodings).

Figure 1B:
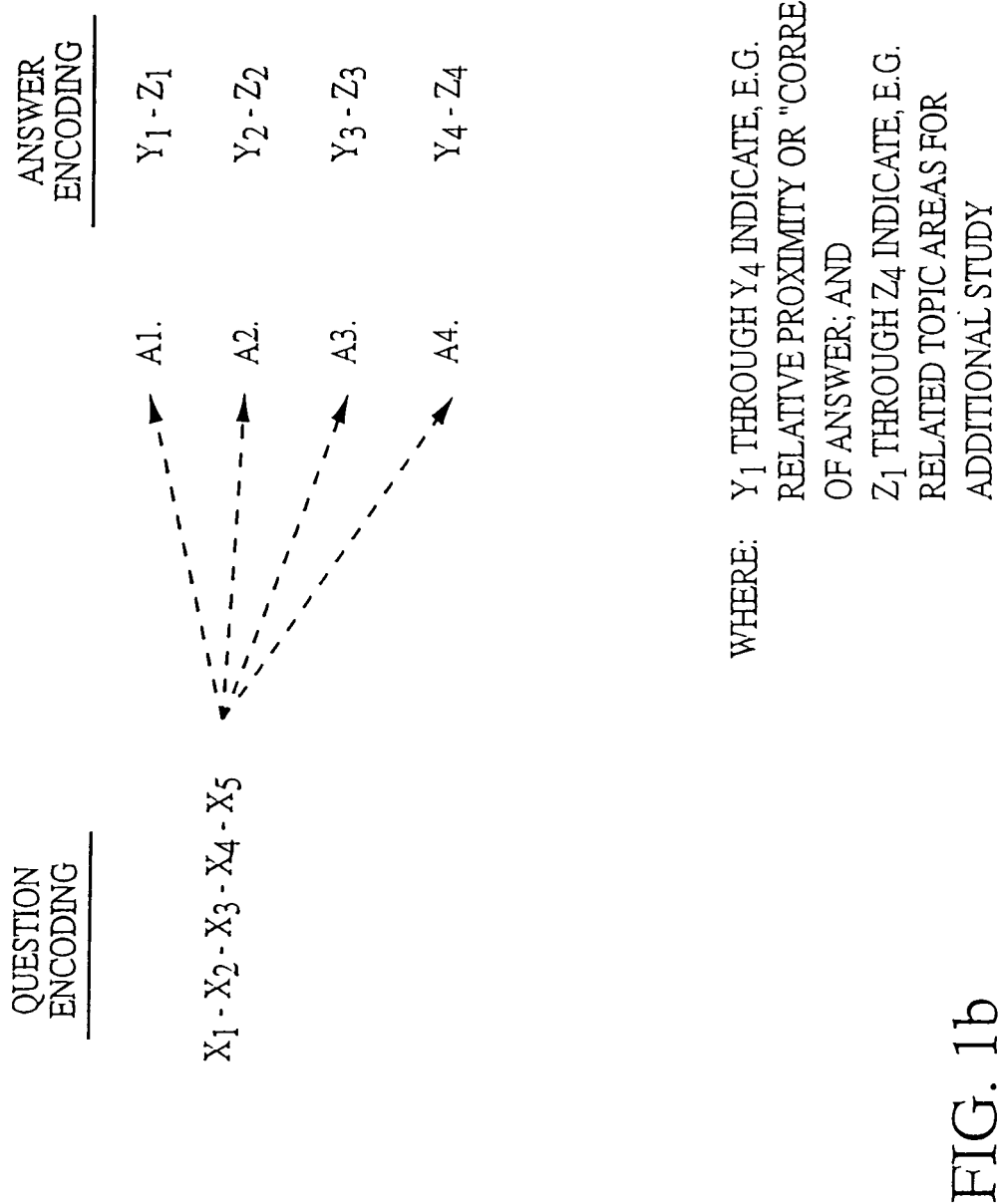
FIG. 1b is a graphical representation of one exemplary answer encoding scheme according to the invention.

Depending on the level of analysis desired, additional or sub-encoding of the data is also possible. For example, in addition to encoding the questions of the examination as previously described, the individual responses of each question may be encoded and used as the bases for evaluation. Consider the simple case where an individual has particular difficulty with questions relating to Doppler effect analysis. Questions relating to the Doppler effect, the physics of acoustics, wavelength and frequency, and other related topics might have their answers encoded such that certain ones of answers in each question are indicative of a significant or gross conceptual error with respect to the subject matter, whereas other responses are indicative of problems with more subtle features or issues relating the subject matter. In this fashion, the individual's "proximity" to the correct answer can advantageously be assessed in real time, in contrast to the prior art approach of simply determining "right or wrong" without respect to the content of the wrong answer. Such answer encodings can also be used as an input to the adaptive functionality of the program (described below), such as to increase the frequency of questions relating to the fundamental physics of the Doppler effect in subsequent portions of the exam so as to build the examinee's knowledge level in that area. FIG. 1b illustrates the foregoing features graphically.

Along the same lines, the program of the present invention may optionally be configured to prompt the user for explanation of his/her answer choice. Specifically, in one exemplary embodiment, the program prompts the examinee (via a pop-up window) to select from a menu of choices best depicting their reasoning for selecting a particular answer after they select that answer. The menu choices are keyed to the answer, such that different question responses will have different menus associated therewith. For example, the menu might have three or four distinct bullet statements each reflecting a different line of reasoning (or alternatively, one choice such as "none of the above") which are keyed to the response selected by the examinee. Such keyed menu choices are accomplished, for example, by encoding the question responses as previously discussed with supplemental codes indicative of the appropriate menu (or storage location in memory where the menu data is stored). The timing feature of the program (described below) is also optionally tolled during this period; i.e., during the period beginning with the examinee submitting an answer to the question, and ending with the examinee selecting one of the "explanations" on the menu, such that the integrity of the timing data is maintained. Accordingly, the examinee is not penalized for thinking about or considering the various lines of reasoning, a potentially valuable teaching tool in and of itself. If the examinee selects the correct answer for the wrong reason, randomly, or based on guessing, there is substantial likelihood that the individual would miss the same question at a later time. Hence, the present invention provides for the analysis of (i) misconceptions in understanding; and (ii) the likelihood of successfully repeating the results of the exam, both important considerations in testing and educational evaluation. FIG. 1c illustrates this feature graphically.

The program of the invention further includes the facility to branch to (i) a rendering of the question in an alternate language of choice (based, for example, on data or information provided by the individual at exam inception); (ii) a rendering of the question in the same language, except having less obscure phraseology and/or multiple phrases describing the same concept; or (iii) a graphical representation of the question, such as based on icons or universal symbols. The control of such selective branching is accomplished during program setup, in the present embodiment via a graphical user interface of the type well known in the art. Branching is triggered in the illustrated embodiment primarily through receipt and analysis of supplemental data or information indicating that a particular learning disability exists, such as an individual testing in a second language who consistently misses questions containing more obscure words or phrases. It will be recognized, however, that branching in the present invention may be triggered by any single criterion or collection of criteria, depending on the particular application.

The timing module of the computer program of the present invention (described in greater detail below) may also be fitted with a manual or automatic "break timer", wherein the individual taking the exam can pause the program and timing functions, such when interrupted during the taking of a practice exam. This feature helps ensure the integrity of the timing-related data (i.e., time to respond to a given question, total time of exam, etc.), thereby resulting in more accurate assessment of an individual's performance. Such pausing may be manually instigated (e.g., by keystroke, mouse click, voice command, etc.), or automatically (such as by receiving no input from the user within a prescribed window of time).

Additionally, the timing module of the program can be equipped to provide the individual with pace information; e.g., whether that individual is ahead or behind the nominal pace for the exam at any given time during the administration of the examination. As used herein, the term "nominal pace" refers to the summation of the allocated time for each question divided by the total time for the examination; i.e., the rate of answering questions at which the examinee may just finish the exam in the allotted time. As is well known, some individuals undergo a period of reduced performance (often induced by increased anxiety) during certain portions of an examination, hence their actual pace may vary significantly with respect to the nominal pace at different times during the examination. The temporal profile of a given examination may also be recorded for each individual, such information being useful in assessing the individual's exam-taking methodology. For example, if the temporal profile indicates that a particular individual spent on average 150% of the nominal time allotted on the first 50% (numerically) of the questions in the exam, and only 50% on average of the allotted time for the last 50% of the questions, then a strong inference is created that the individual was bogged down or otherwise over-analyzed the first grouping of questions, and then, when confronted with too little time remaining for proper analysis, made "educated guesses" as to the last 50% of the questions (assuming relatively uniform distribution of question type, difficulty, and subject matter). Such information would tend to indicate that the individual suffers from poor test-taking and time management skills in addition to or instead of a lack of command of the relevant subject matter.

The computer program of the present invention is also optionally equipped with embedded references to other questions, examinations, or topics, including "primer" material on the topic of weakness. For example, if the encodings of one or more questions indicate a potential knowledge deficiency with respect to a particular category/sub-category, then the examination may by configured to pause upon the occurrence of a predetermined event (e.g., the failure to answer three consecutive questions in that category/sub-category) and display a summary or recap of that particular subject matter for real-time use by the examinee. Alternatively (or additionally), the program may adaptively alter the subsequent structure of the examination to incorporate more questions relating to that subject matter, or alter the subsequent structure to include questions relating to subject matter related to the that of the failed questions and with which the examinee may have problems as well. This latter option allows the program to adaptively probe the knowledge level of the individual(s).

A multi-dimensional correlation table or matrix arrangement is also provided, wherein the relationship between the category/sub-category of the missed question(s) and that of related subject matter is defined by a multi-dimensional table or matrix which is accessed by the program during operation in order to identify areas of potential related weakness. In the simple example of a first (missed) question or group of questions having encoding of $i_x$, $j_x$ as primary category/sub-category, respectively, related topics may be defined to include those having the same sub-category; e.g., all other questions having $j_x$ as either a principal or secondary a subcategory encoding.

As yet another alternative, the sub-category parameter $[j_x]$ may be related to other questions through a transformation matrix or correlation table of the general type well known in the art, whereby the sub-category $[j_x]$ of the missed question is used as an input, where from one or more related sub-categories are identified using the matrix/correlation table. Such transformation matrix or correlation table may be stored, for example, in random access memory, the address of which is accessed by the algorithm when the triggering criterion is met (e.g., three missed category [jx] questions). As an example, if the primary category $[i_x]$ encoded for a particular question is "particle physics", and the sub-category $[j_x]$ is "neutrinos", then the transformation matrix for $[j_x]$ might yield related sub-categories including "anti-neutrinos" $[jr_1]$ and "leptons" $[jr_2]$. Hence, the program would selectively insert particle physics (i.e., category $[j_x]$) questions having $[jr_x]$ or $[j_x]$ encodings corresponding to leptons and anti-neutrinos into the examination to help probe and evaluate the examinee's knowledge level in these related areas.

Figure 1D:
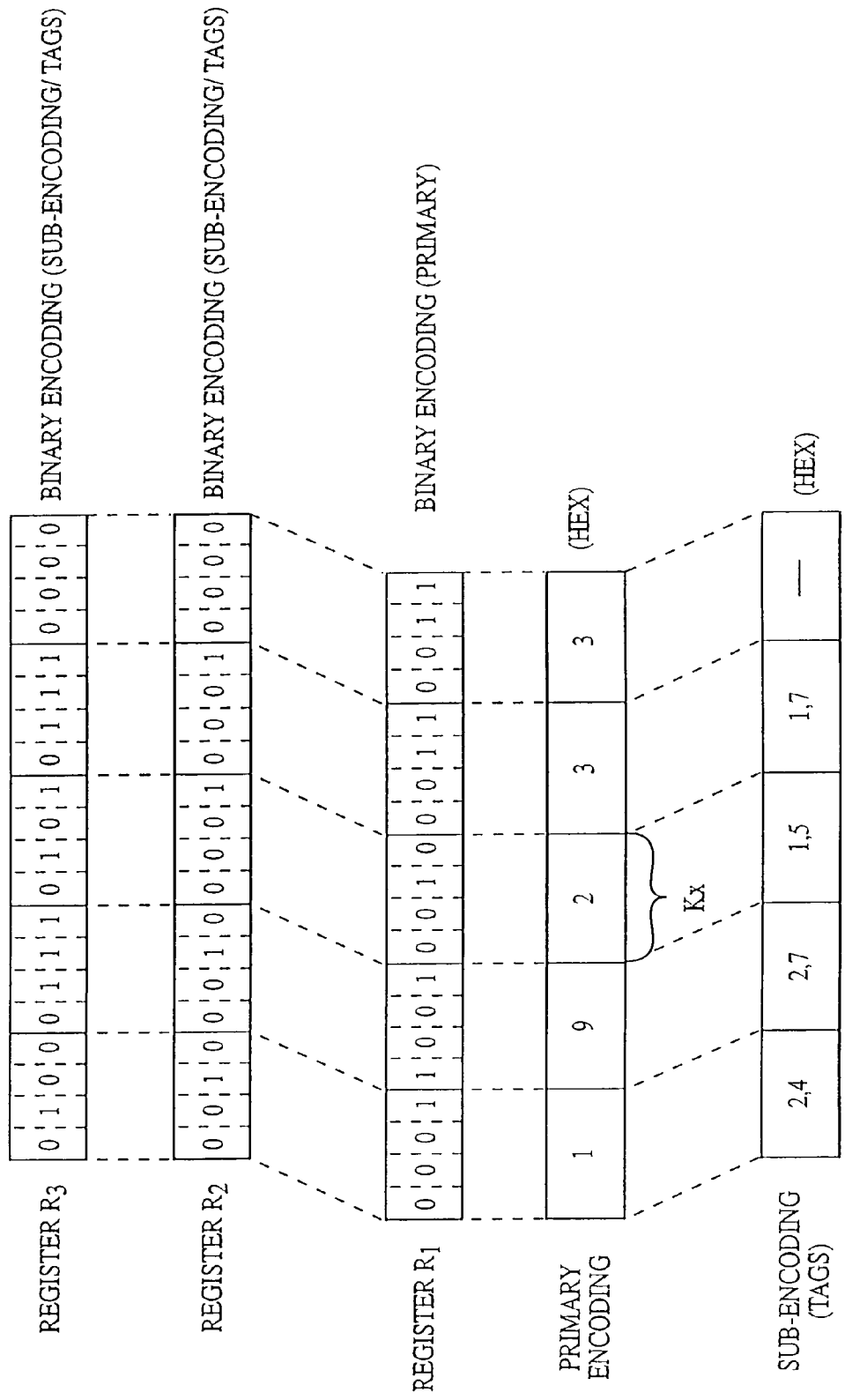
FIG. 1d is a graphical representation of another embodiment of the question encoding scheme according to the invention, including sub-encoding tags associated with each primary encoding.

As yet another alternative, sub-encodings or "tags" may be utilized with each question, these tags being accessed in the event that the question (or a given number of similar questions, for example) is missed. The tags indicate the related categories and/or sub-categories of questions to be subsequently inserted into the exam (or used on a later exam). For example, if three successive questions having a secondary category encoding $k_x$ correlating to A-mode ultrasonic signal processing are missed by an individual, then the program would access the secondary category sub-encodings (tags) encoded for those three questions to build a listing file comprising each of the tags from each of the three questions, which may or may not be the same. This composite listing is then used as the pool from which supplemental or substitute questions are taken and inserted into subsequent portions of the exam structure. In this fashion, each exam question effectively carries the transformation matrix or correlation table directly within its encoding. FIG. 1d illustrates one exemplary methodology of encoding with tags as described above.

In addition to the encoding scheme, other supplemental parameters of the exam of the present invention may be monitored, such as for example the amount of time used per question, amount of time re-reviewing each question, the number of times each response has been changed by the individual within each exam period, the number of wrong-to-right answer changes, right-to-wrong answer changes, wrong-to wrong-changes, the sequence of the various question types presented to the individual(s), and the like. These parameters may be useful in accurately assessing particular deficiencies within the individual, including learning disabilities (such as attention deficit disorder, or ADD), physical impairments, conscious or subconscious preference for certain formats or modes of testing, etc. Facial expression, heart rate, blood pressure, voice inflection/tones, and any other host of physiologic parameters may also be monitored if desired in conjunction with the examination in order to more accurately interpret the individual's performance. For example, by using only question encodings as a basis for subsequent evaluation, the results for a given individual might be interpreted to indicate weakness in questions relating to mathematical relationships and equations. However, analysis of the response time, number of changed answers, etc. for that same examination might indicate that the individual merely ran out of time, and "guessed" at the last X number of questions, such last X questions comprising several questions directed to mathematics/equations. Alternatively, the supplemental information (including time taken to answer and various physiologic inputs) might indicate that the individual simply guesses at these questions immediately without spending any significant time reading or analyzing the question, due for example to an adverse psychological response to viewing complicated mathematical equations. It will be recognized that myriad combinations of such supplemental parameters may be measured and used in conjunction with the question encodings previously described herein.

As part of the invention, performance statistics may also be dynamically calculated for the individual(s) during the examination, such as for example to apprise the individual(s) or those administering the exam of their performance as a function of time during the course of the examination, and optionally make adjustments based thereon. Accordingly, the present invention contemplates "adaptive" examination techniques which dynamically alter the type, quality, or quantity of certain questions, or other parameters associated with the examination during the examination based on data obtained for the individual taking the exam and/or others previously or contemporaneously tested. For example, as previously described, if statistics calculated for an individual during a first portion of an examination indicate that the individual has difficulty with questions relating to mathematics/equations, then the program of the present invention may be configured to respond during subsequent portions of the same examination in a predetermined fashion, such by increasing the frequency and decreasing the difficulty level of questions involving mathematics/equations.

As yet another example, the statistics obtained from a plurality of individuals being tested simultaneously may be used to determine or drive the question mix provided during subsequent portions of the examination. If the statistics during the first portion of the exam indicate that there is a very high correct answer percentage for questions of a certain type (and low average time in responding thereto), the program may be configured to increase the difficulty level of questions provided to all individuals, supplement such questions with another type of question, etc. Such approach is especially useful where the examination is being taken for purposes of practice or skill enhancement, since the adaptive nature of the examination may be used to more completely challenge the individual examinees in selected areas of knowledge.

The present invention may also be configured to provide tailored observations, suggestions or recommendations to the individual(s) based on observed performance. For example, a bifurcated analysis of the individual's responses may be performed, wherein only the individual's first or initial responses are analyzed and graded, and then subsequently the final set of responses by the same individual are graded as well. The first grading is representative of the individual's score had no answers been changes from their initial value, while the second grading reflects the individual's ultimate grade when considering all "changed" responses. The former grade may actually be higher than the second for certain individuals, indicating that the individual tends to "overanalyze" the questions/responses, and may achieve a better grade by simply staying with their first response. Accordingly, when a positive differential between the first and second grades (first higher than second) is detected by the program, a pre-stored mode message reflecting this fact is displayed on the screen for the examinee. Similarly, if a negative differential is detected, a different mode message is displayed (or no message displayed, indicating that the examinee's current practice of re-evaluating their responses is appropriate).

Figure 2:
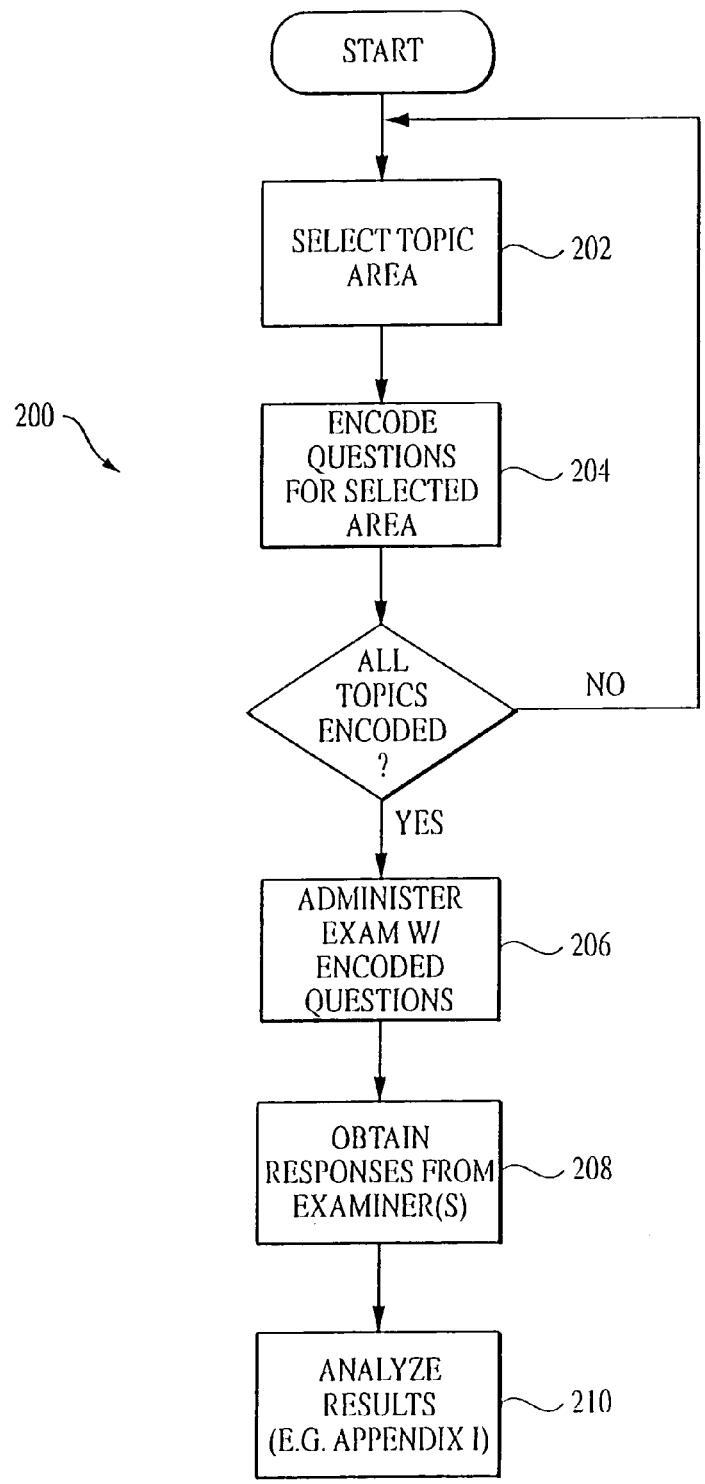
FIG. 2 is a logical flow diagram of one exemplary embodiment of the method of evaluating the performance of one or more individuals using encoded questions according to the present invention.

FIG. 2 illustrates one exemplary embodiment of the methodology of evaluating the performance of one or more individuals according to the invention. As shown in FIG. 2, the methodology 200 generally comprises first selecting a topic or subject area (step 202). One or more questions are then encoded (step 204) based on the selection of step 202. Once all topics have been encoded, the exam is administered to one or more individuals (step 206). During administration, a plurality of responses are received from the individual(s) per step 208 corresponding to the questions previously encoded in step 204. The responses are then analyzed (step 210) using the methodologies as previously described herein.

Appendix I provides a detailed discussion of one exemplary embodiment of the encoding scheme, evaluation algorithms and equations, and methodologies of the present invention. It will be recognized that while the examples of Appendix I are cast in terms of the ultrasound physics questions, literally any topics (or aggregations/combinations of topics) may be used consistent with the invention.

Figure 3B:
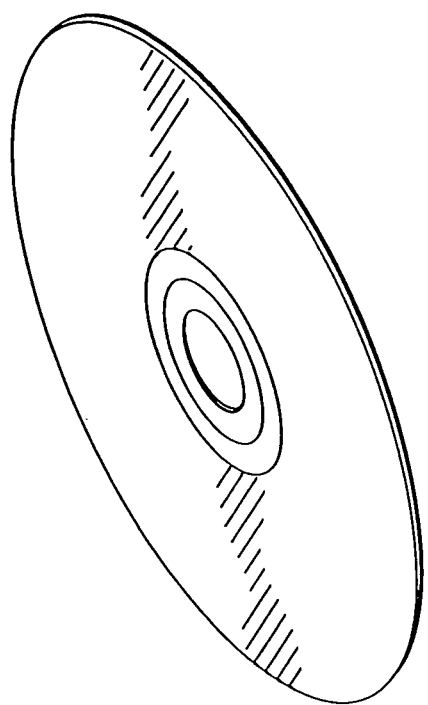
FIGS. 3a-3b are perspective views of two exemplary media, respectively, adapted to store the computer program of the present invention.
Figure 3A:
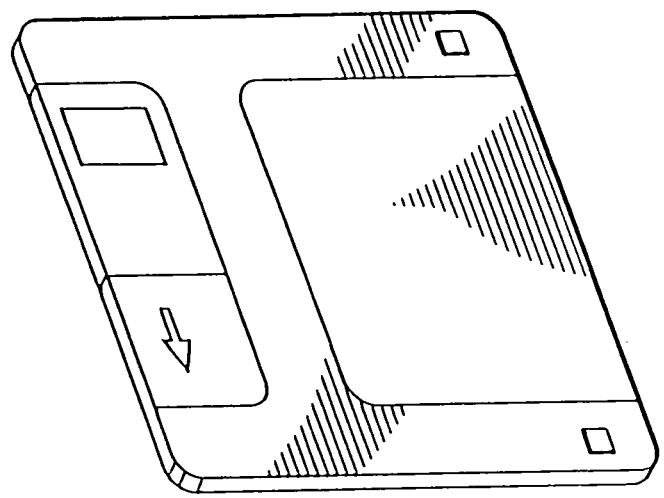

A computer program for implementing the aforementioned methods of evaluation is now described. In one exemplary embodiment, the computer program comprises an object ("machine") code representation of the well known Authorware™ source code listing implementing the methodology of FIGS. 1 through 2, either individually or in combination thereof. While Authorware v. 5 (Version 5) is selected for the present embodiment for its ease of use, ready modification, and ability to incorporate various forms of media, it will be appreciated that other programming languages and programming architectures may be used (object-oriented or otherwise), including for example Director™, Flash™, VisualBasic™, Fortran, Java™, CORBA, and $C^{++}$. The object code representation of the source code listing is compiled and disposed on a media storage device of the type well known in the computer arts, as illustrated in FIGS. 3a-3b. Such media storage devices can include, without limitation, optical discs, CD ROMs, magnetic floppy disks or hard drives, DVDs, "smart" cards, memory chips, tape drives, or even magnetic bubble memory. The computer program further comprises a graphical user interface (GUI) of the type well known in the programming arts, which is operatively coupled to the display and input device of the host computer or apparatus on which the program is run.

In terms of general structure, the program is in one embodiment comprised of a series of subroutines or algorithms for implementing the question/examination encoding, generation, timing, evaluation, and other related methodologies previously described herein based on examinee responses (and optionally measured parametric data) provided to the host computer. In a second embodiment, the computer program comprises an assembly language/micro-coded instruction set disposed within the embedded storage device, i.e. program memory, of a digital processor or microprocessor associated with an examination device, including portable devices which may be in data communication with a network. In yet another embodiment, the computer program comprises an object-oriented distributed application having, for example, a server or comparable portion and a client portion. The client portion is comparatively "thin" as compared to the server portion so as to facilitate download and/or storage on the less hardware-capable client device (e.g., set-top box, PDA, handheld computer, etc.).

Figure 4A:
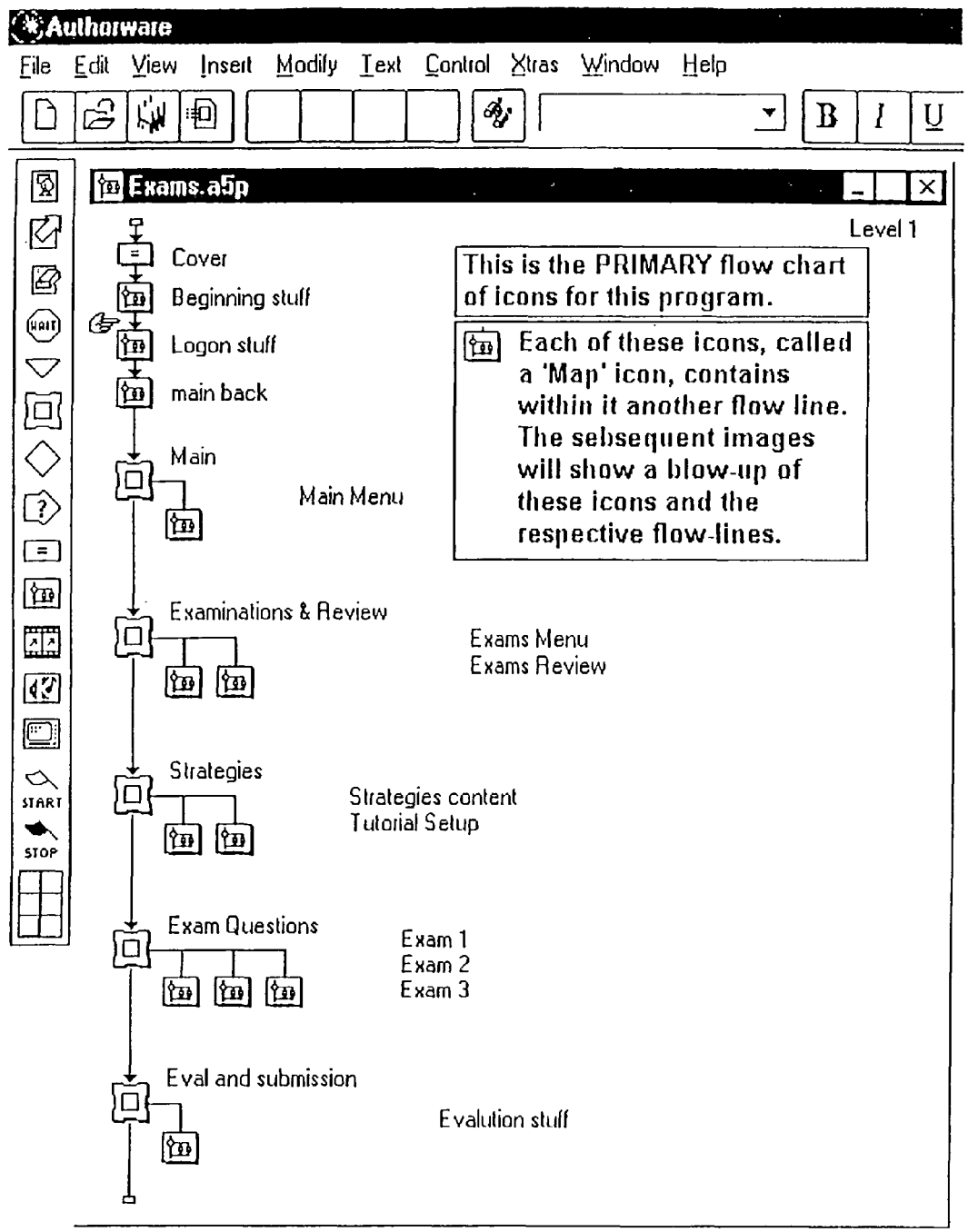
FIGS. 4a-4z are graphical representations of an exemplary Authorware™-based computer program embodying the methodologies of the present invention.
Figure 4B:
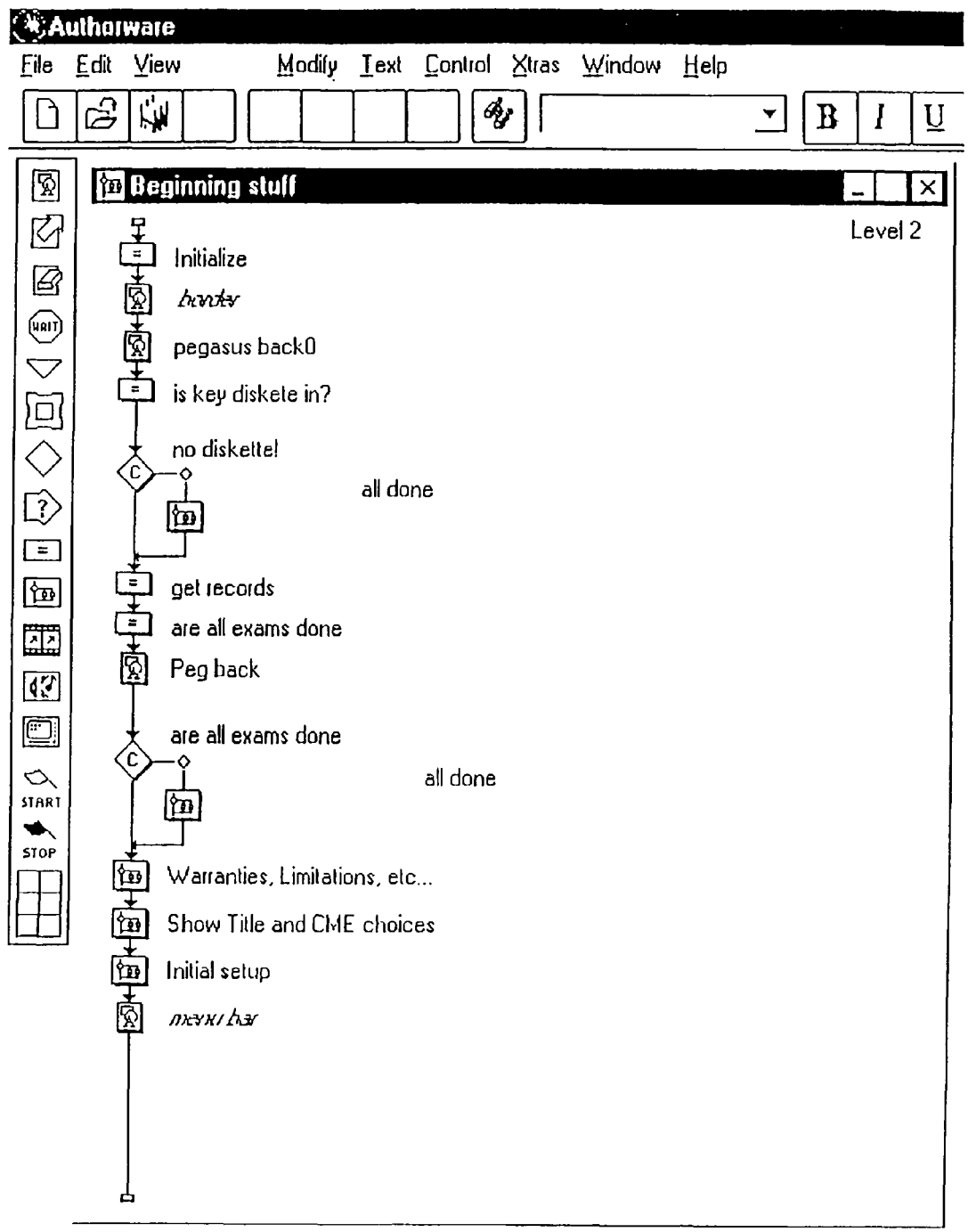
Figure 4C:
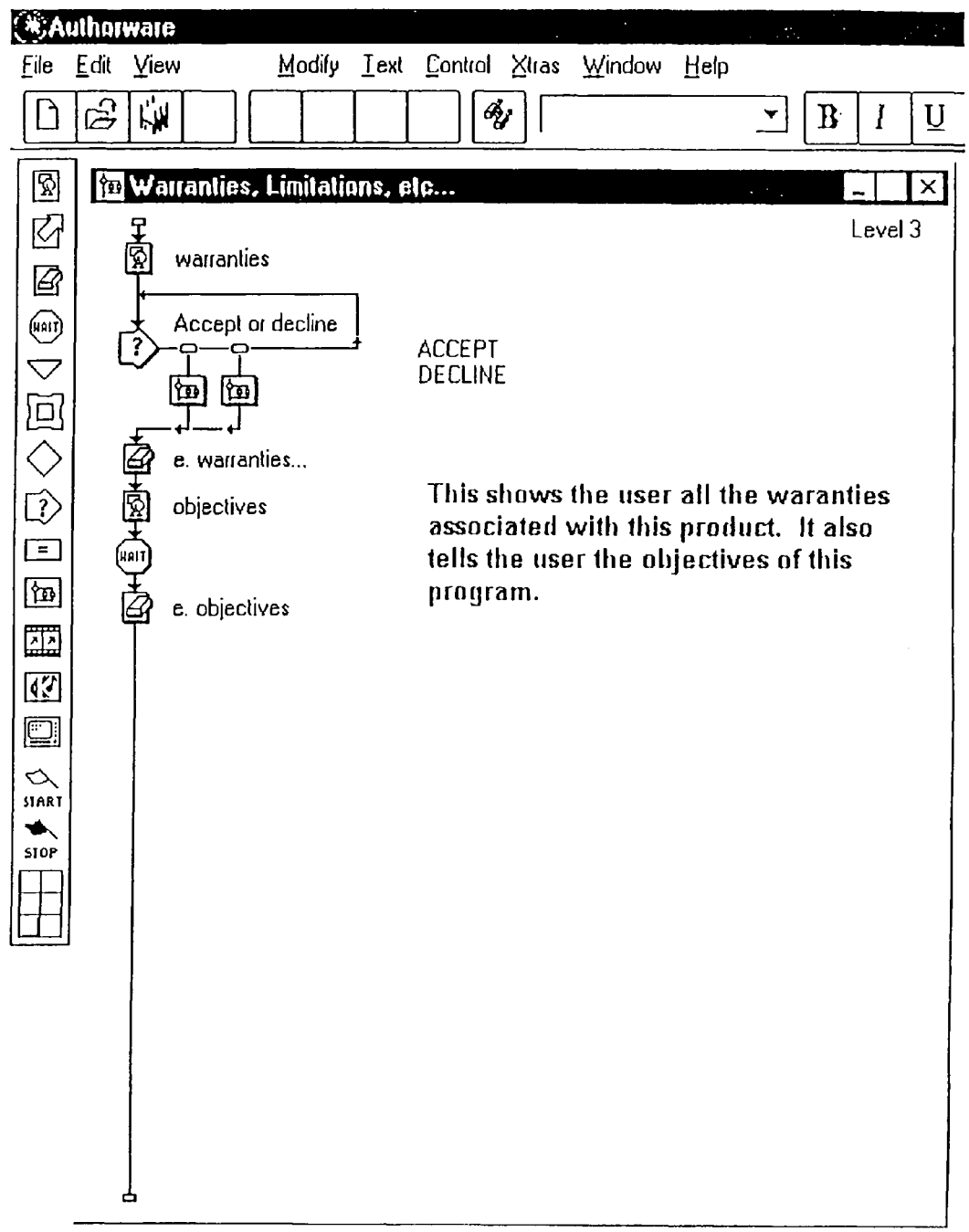
Figure 4D:
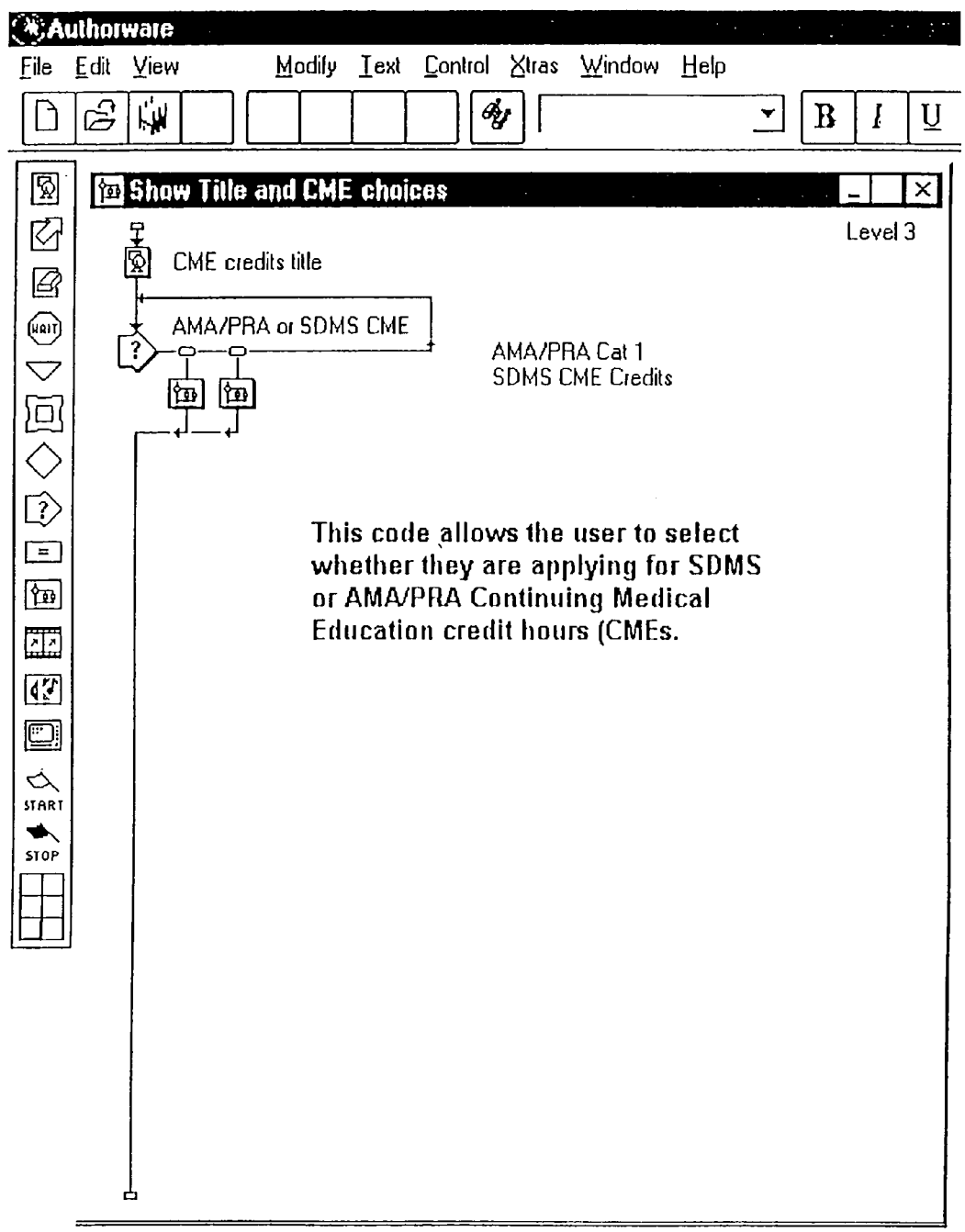
Figure 4E:
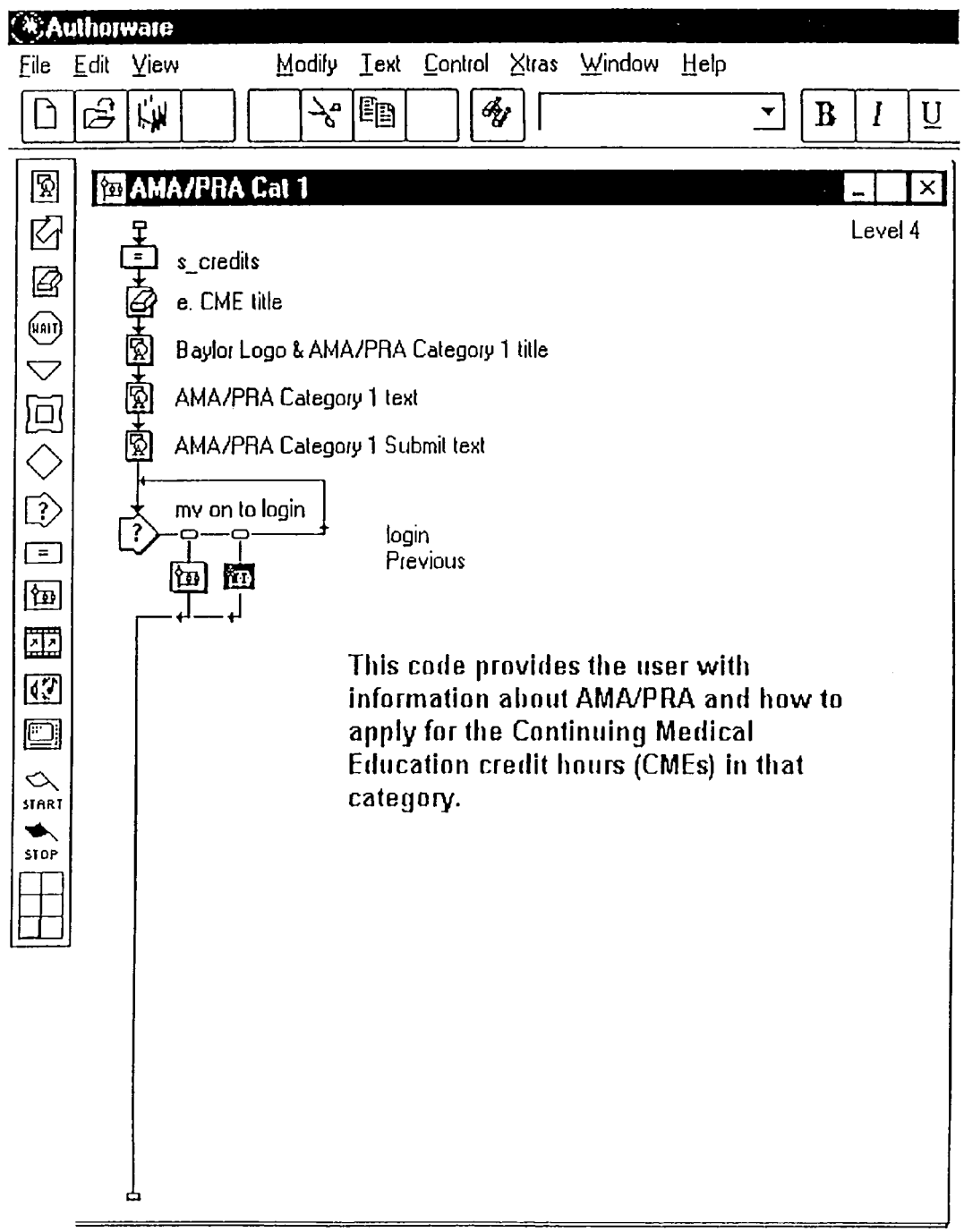
Figure 4F:
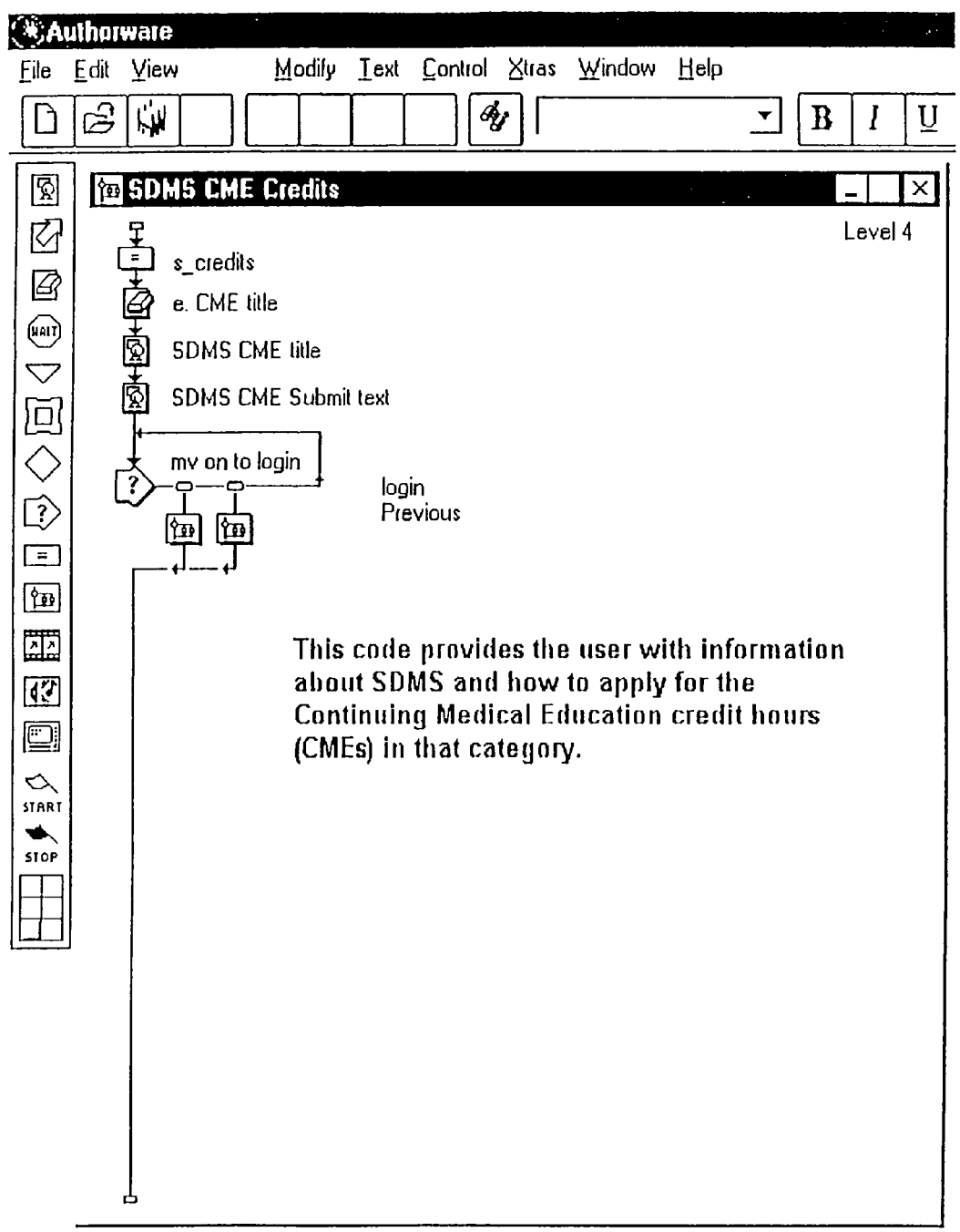
Figure 4G:
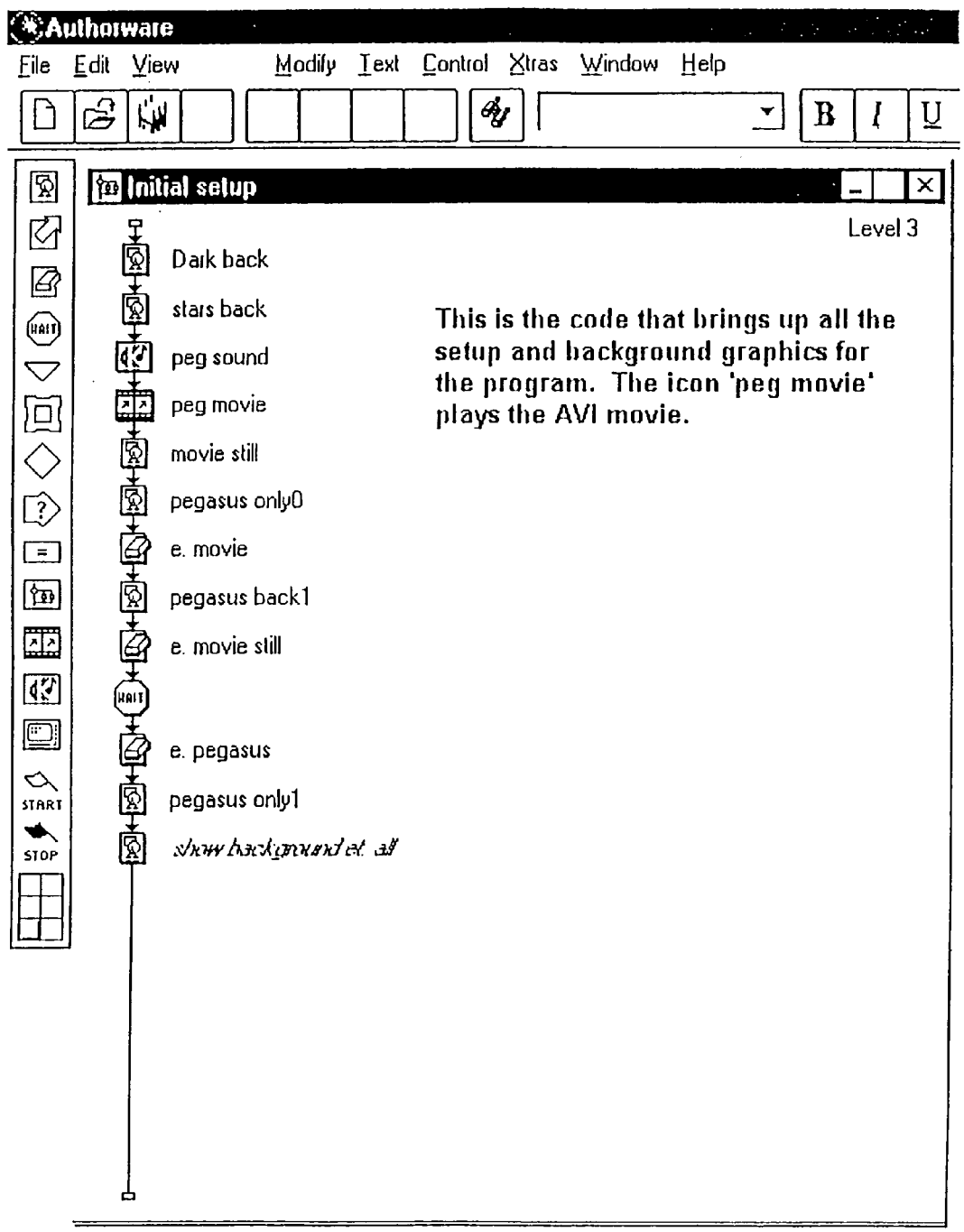
Figure 4H:
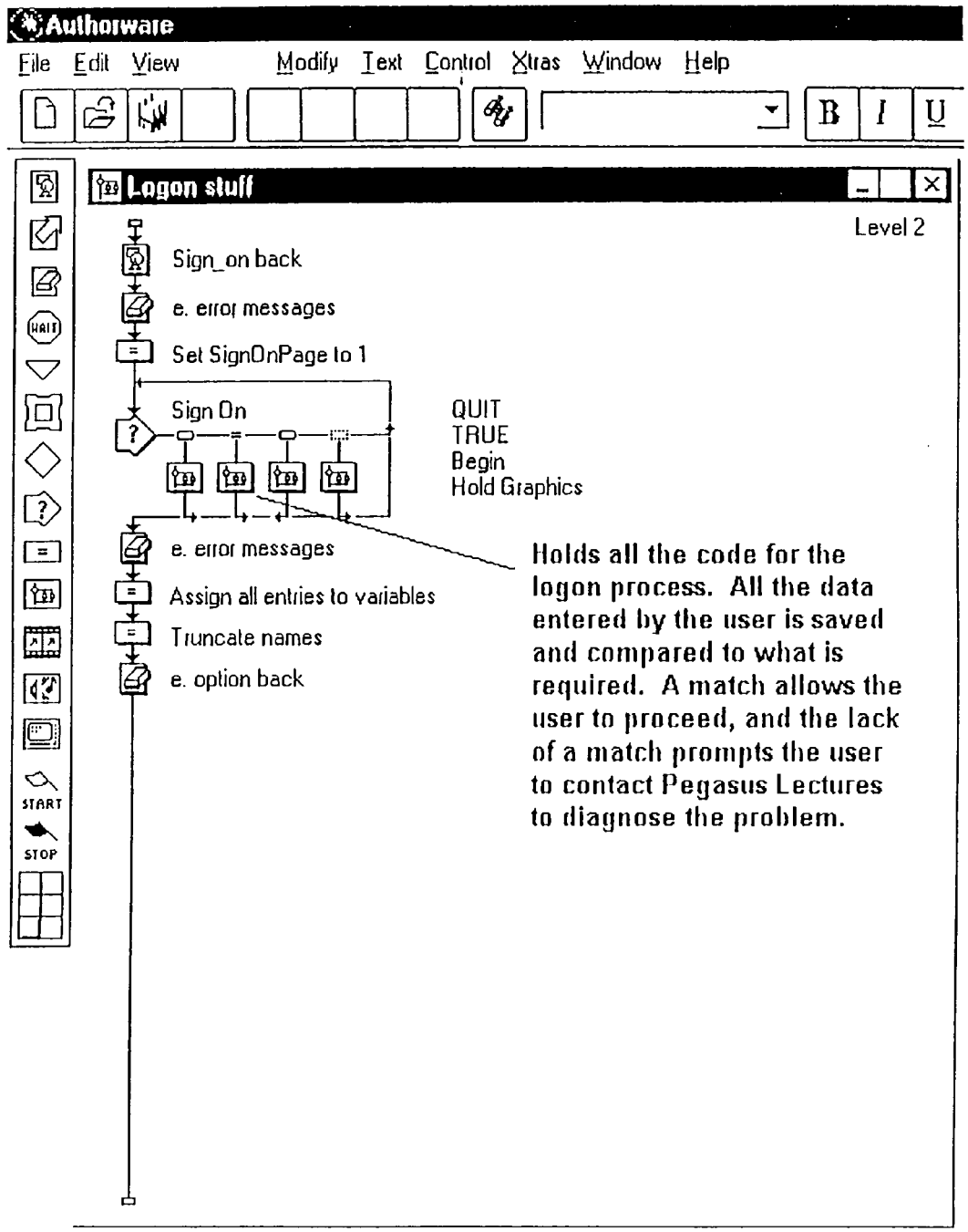
Figure 4I:
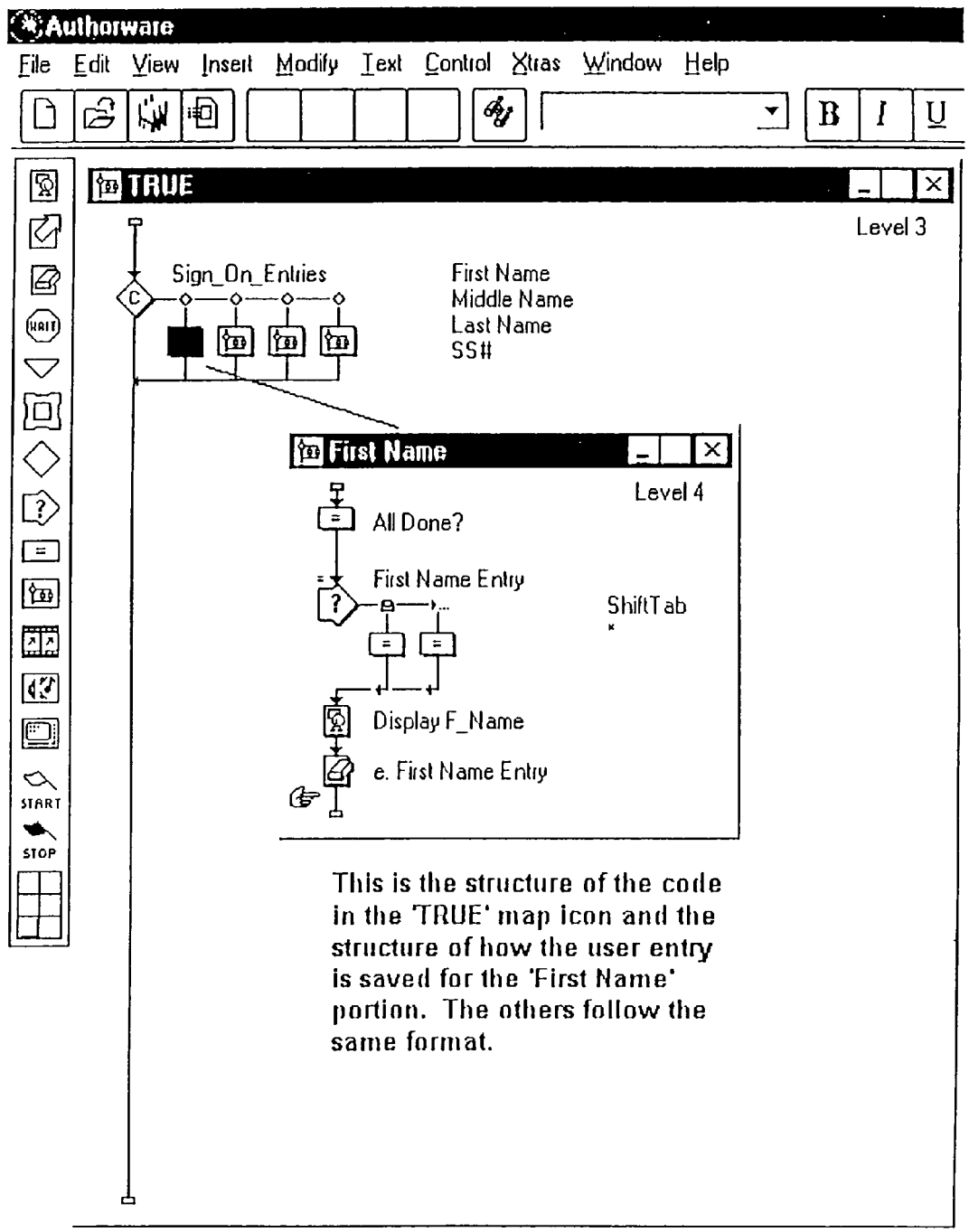
Figure 4J:
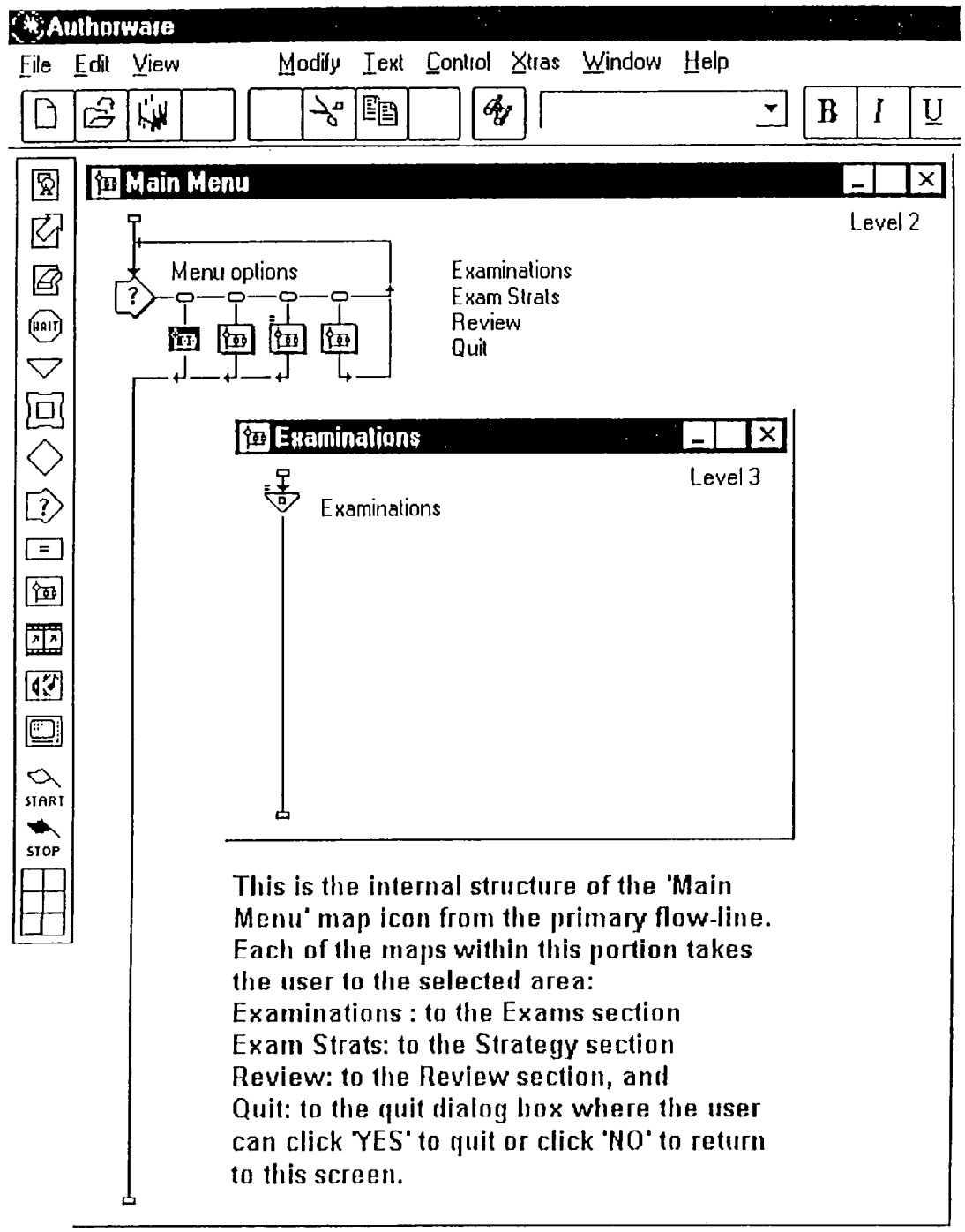
Figure 4K:
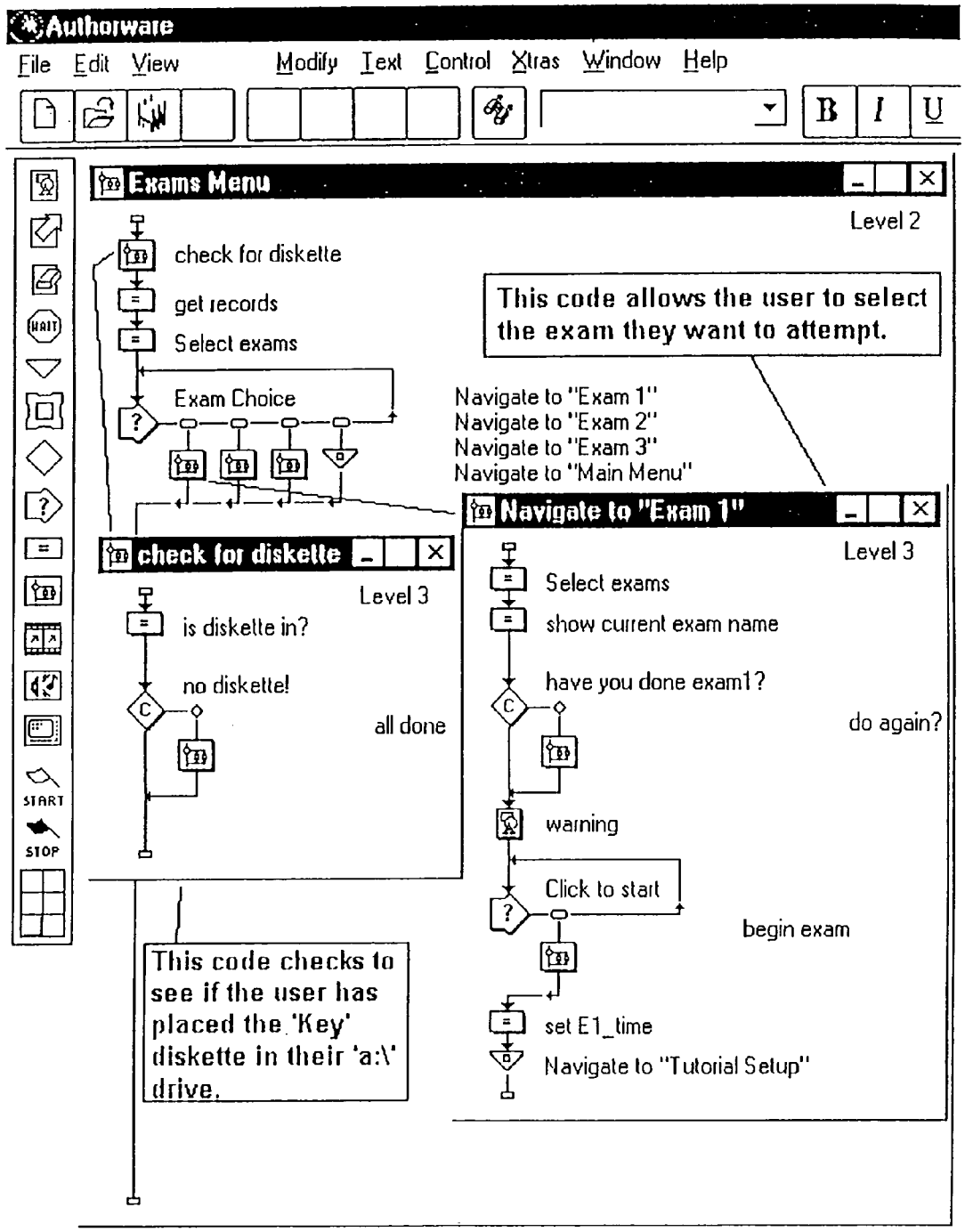
Figure 41:
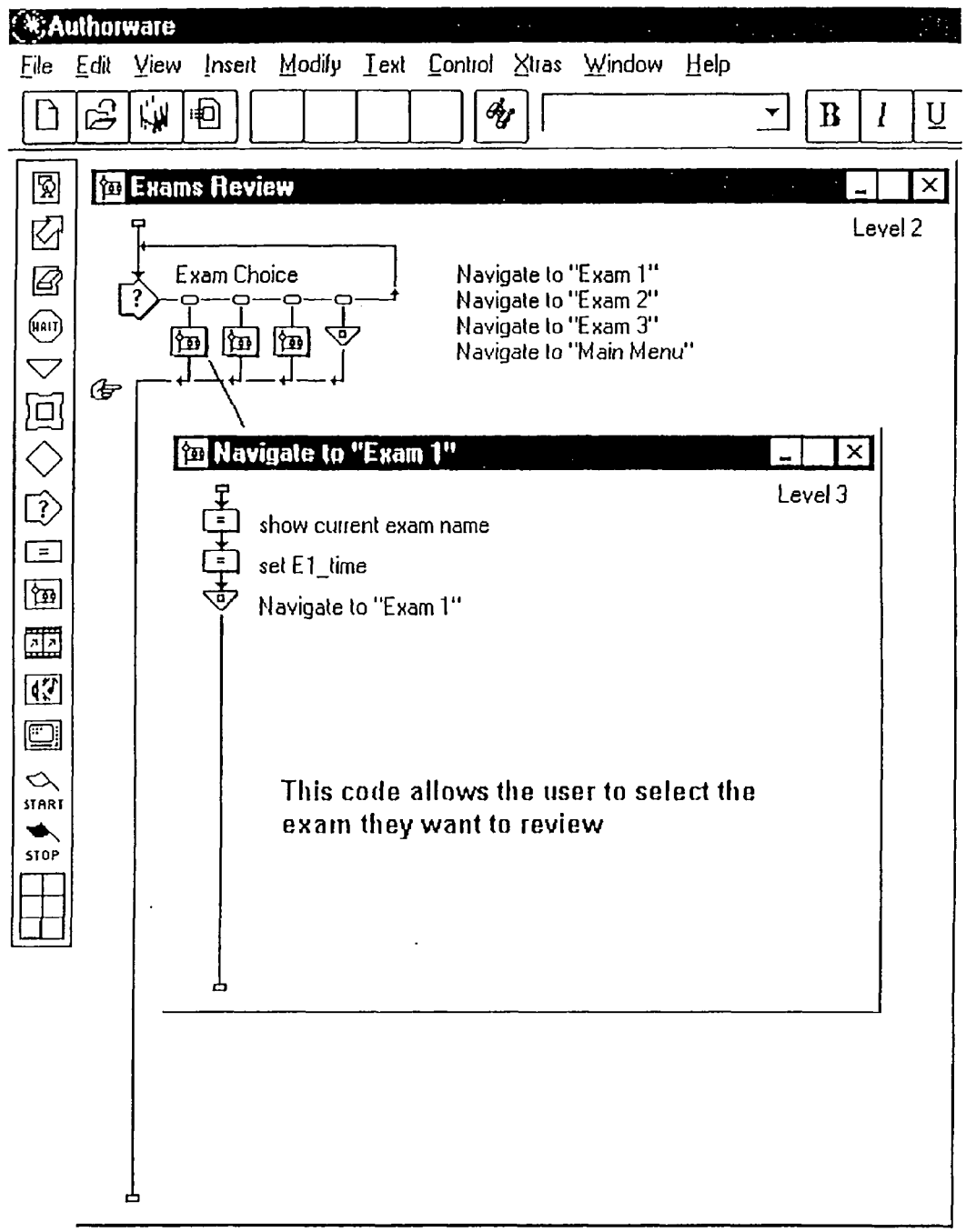
Figure 4M:
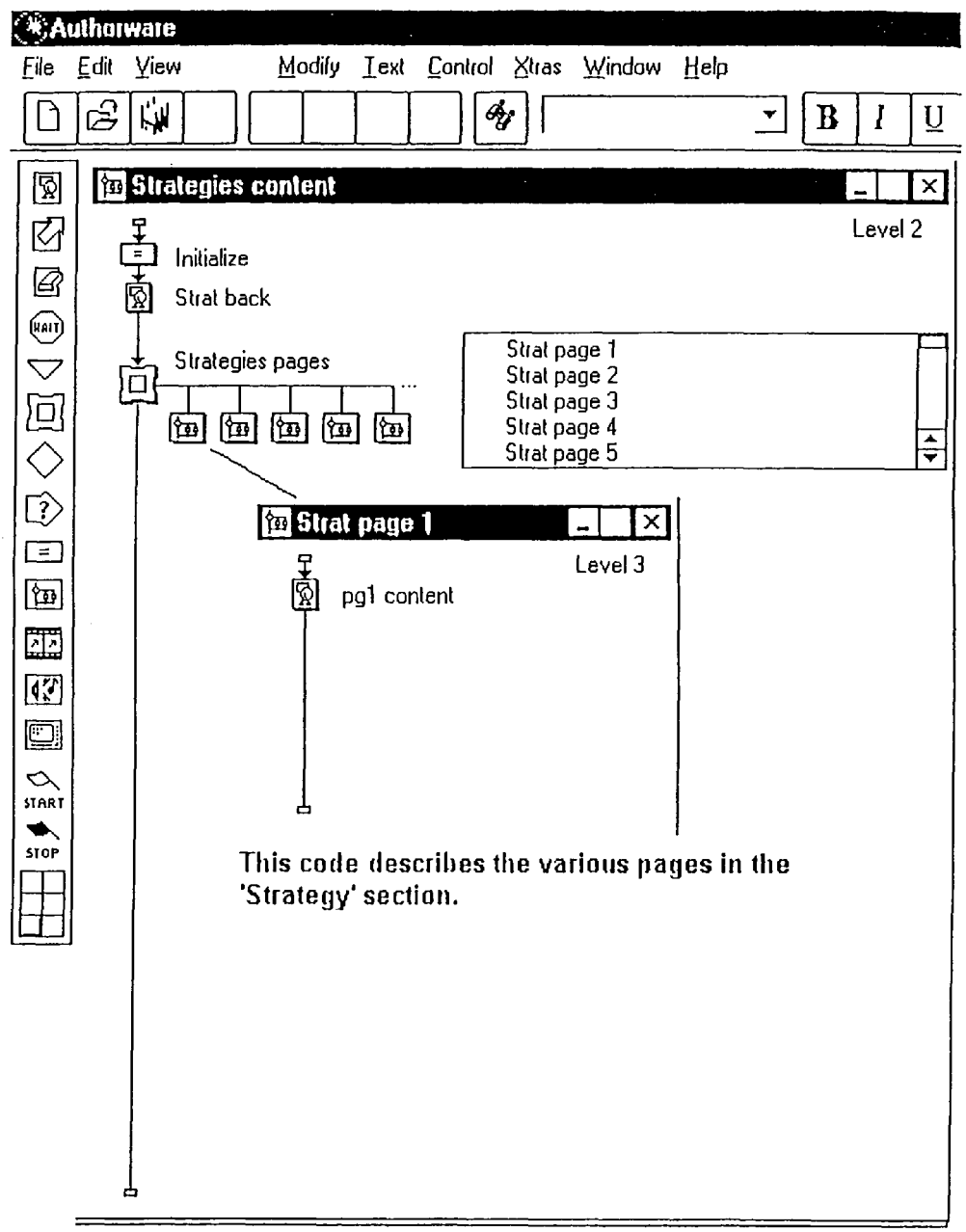
Figure 4N:
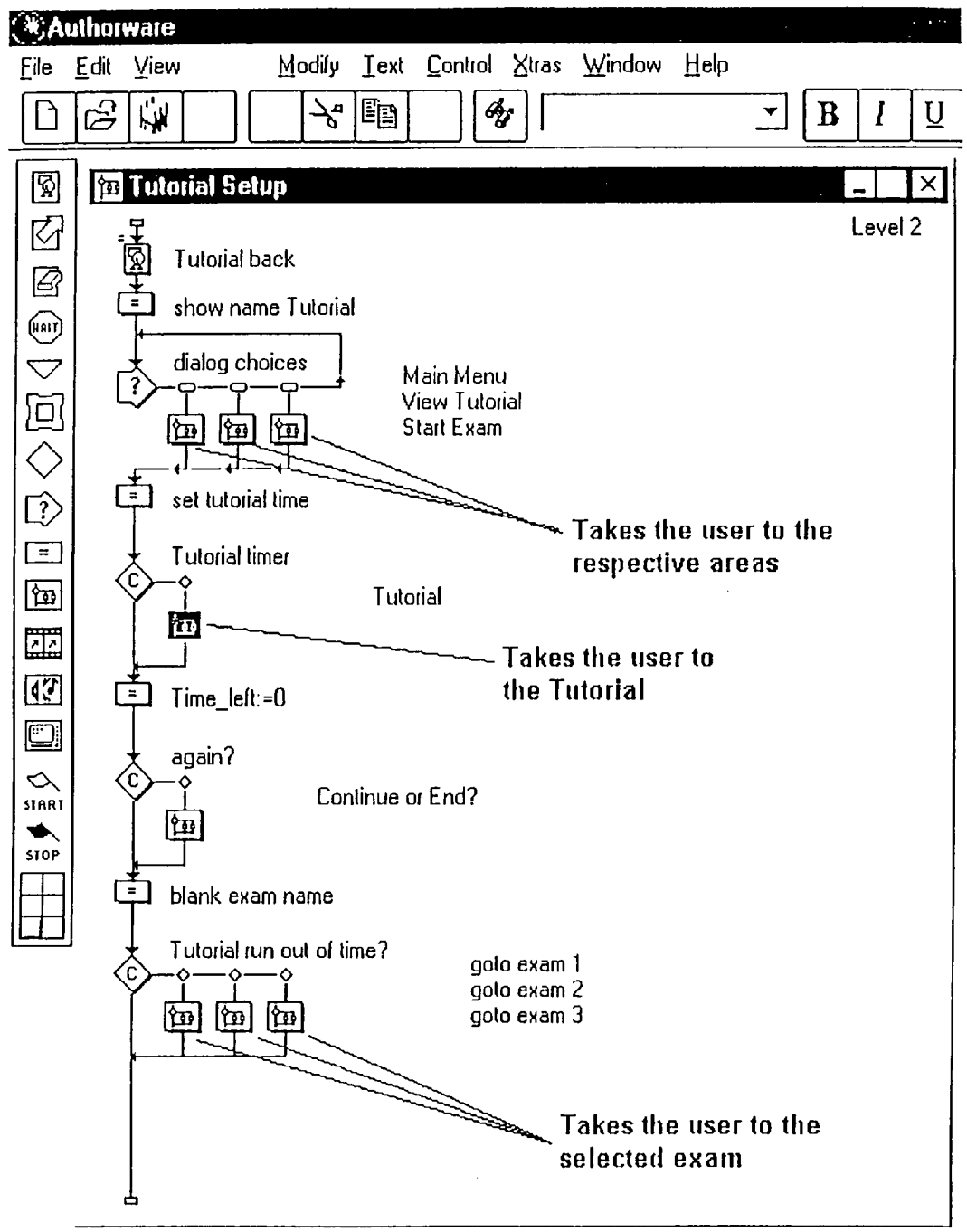
Figure 4O:
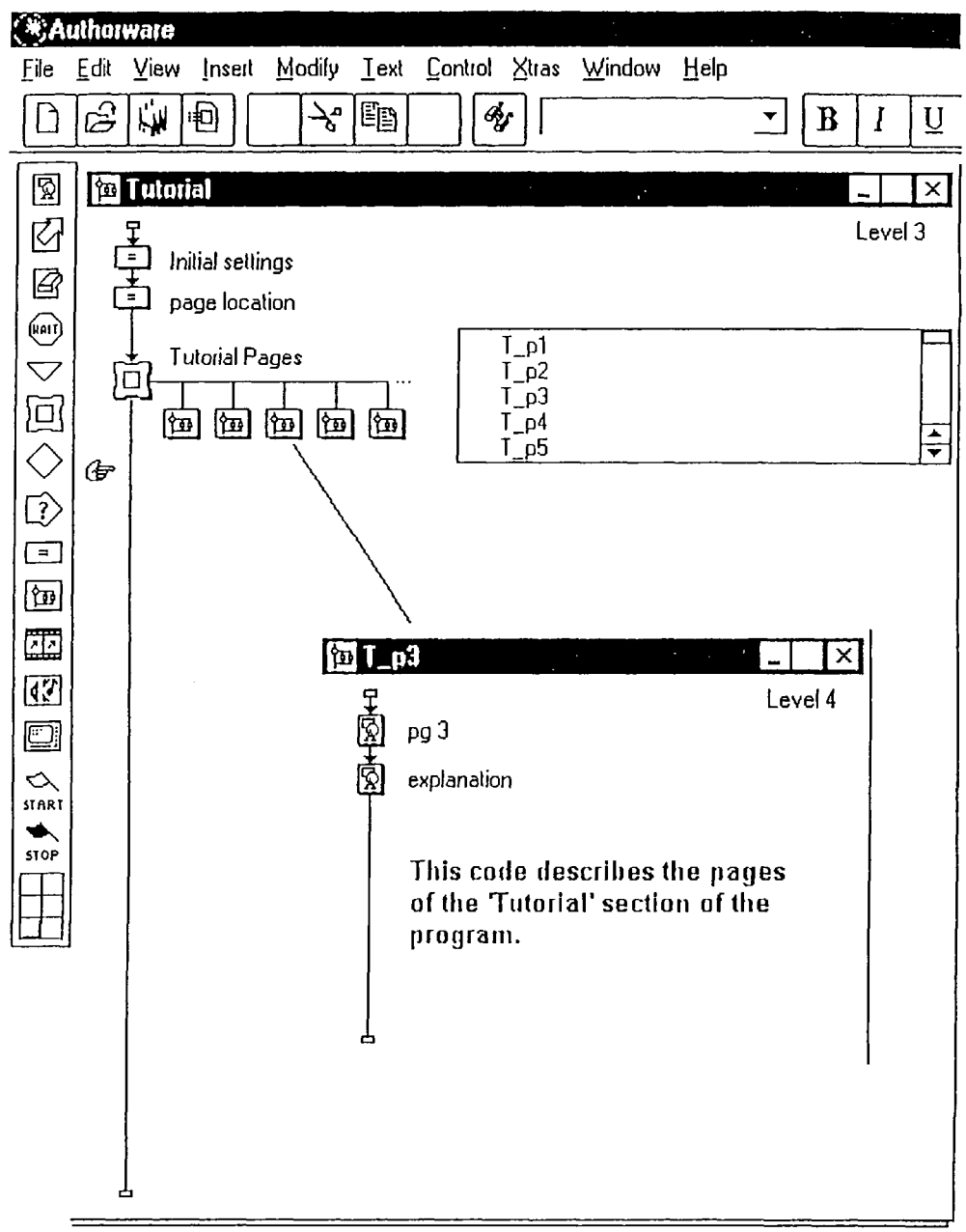
Figure 4P:
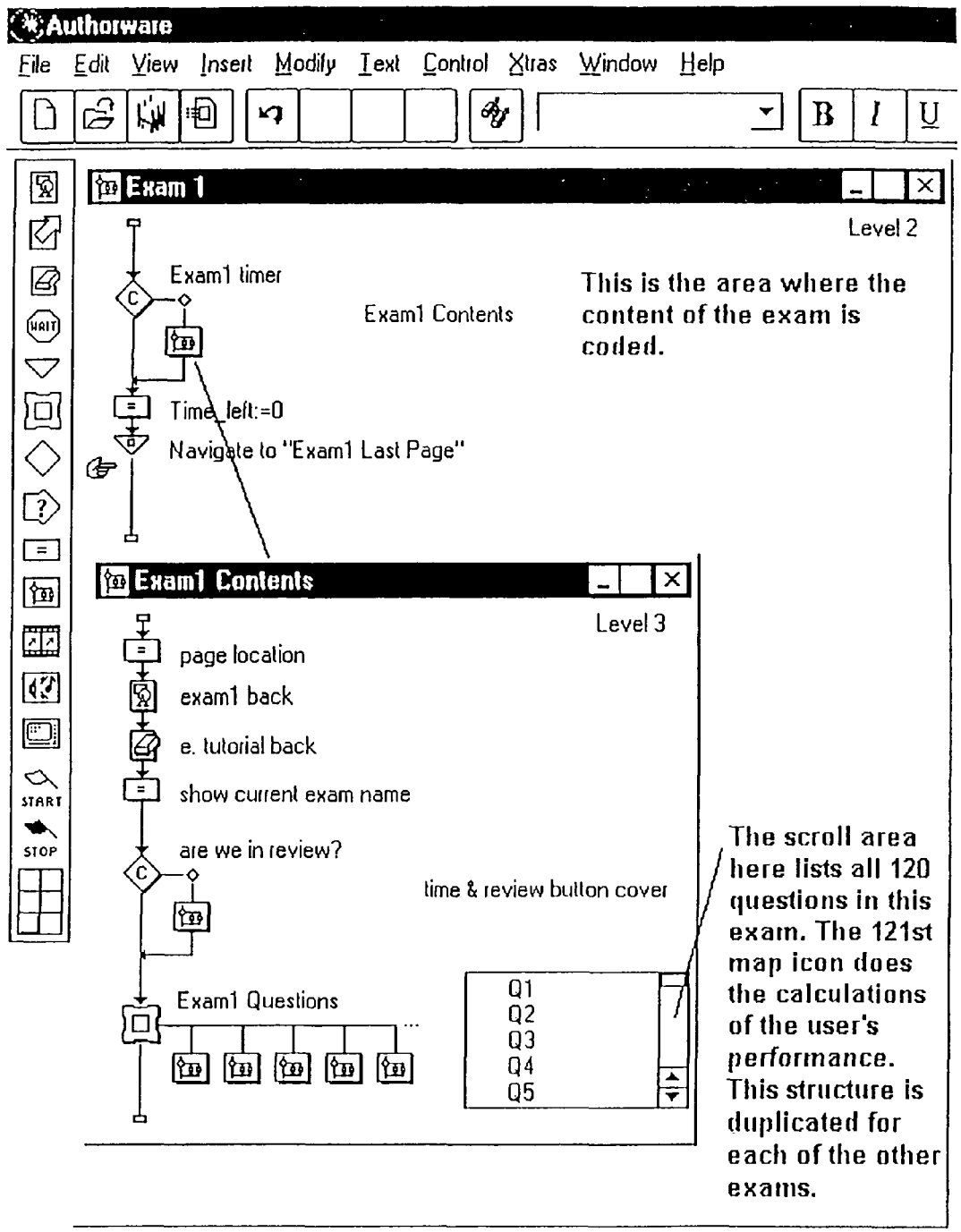
Figure 4Q:
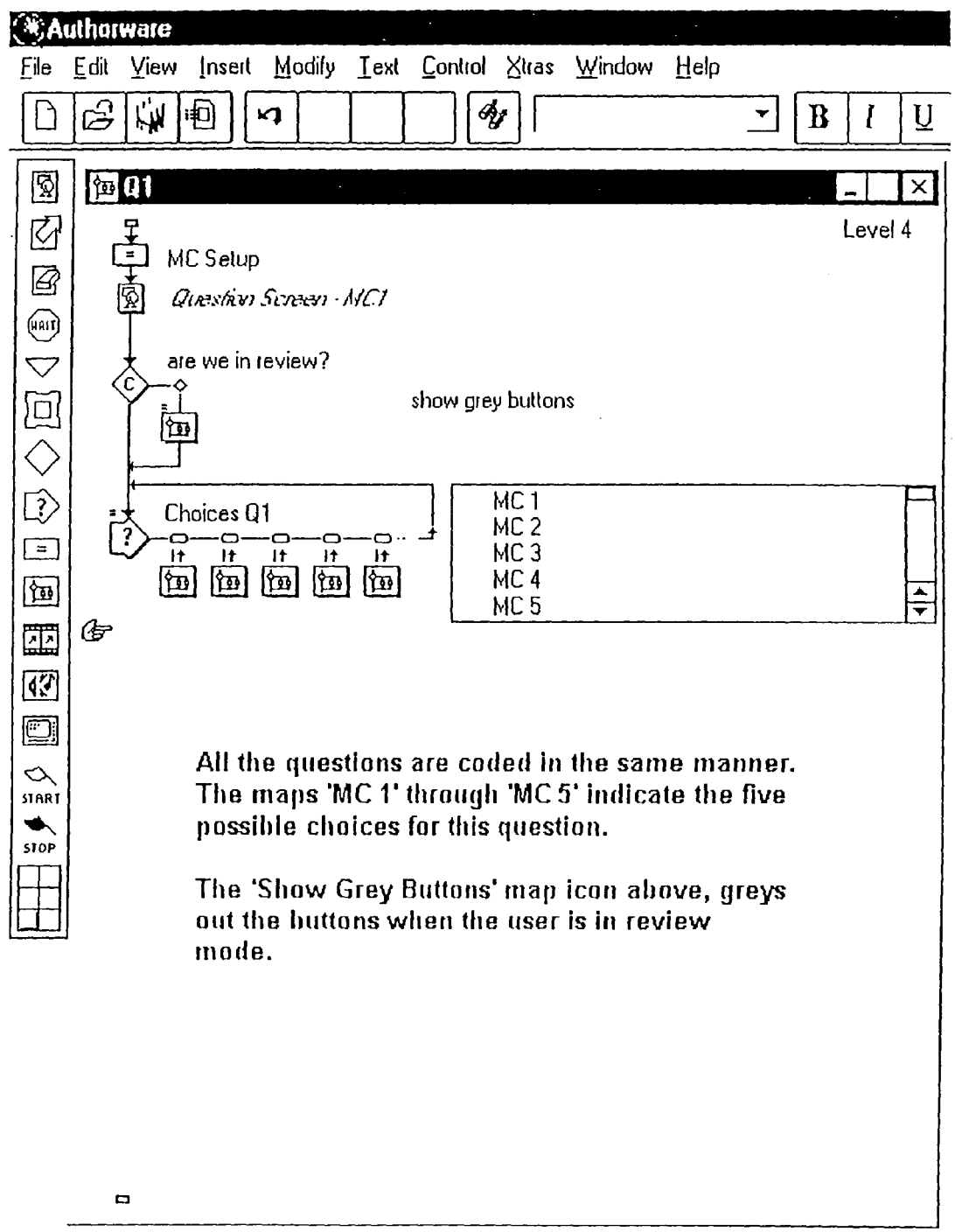
Figure 4R:
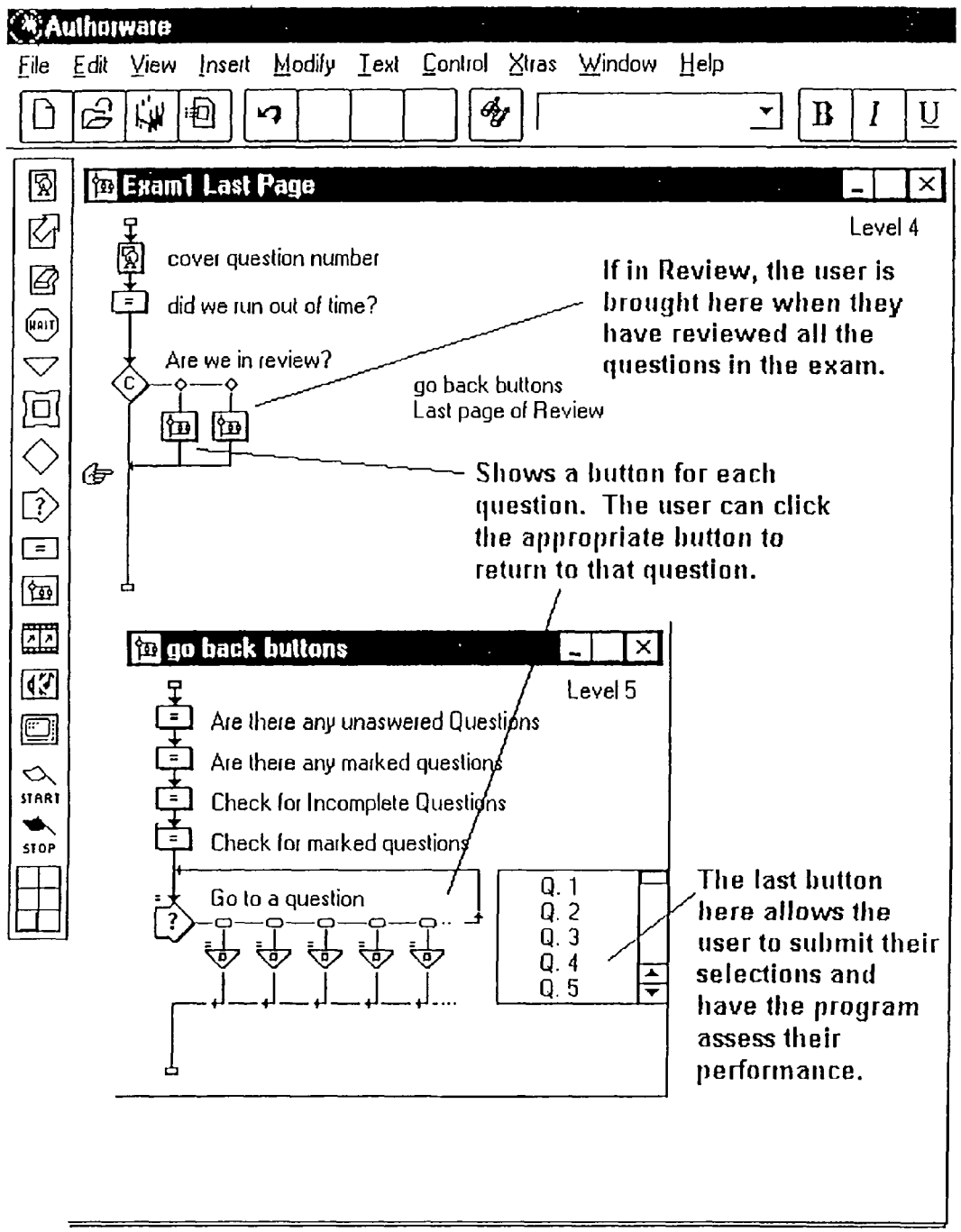
Figure 4S:
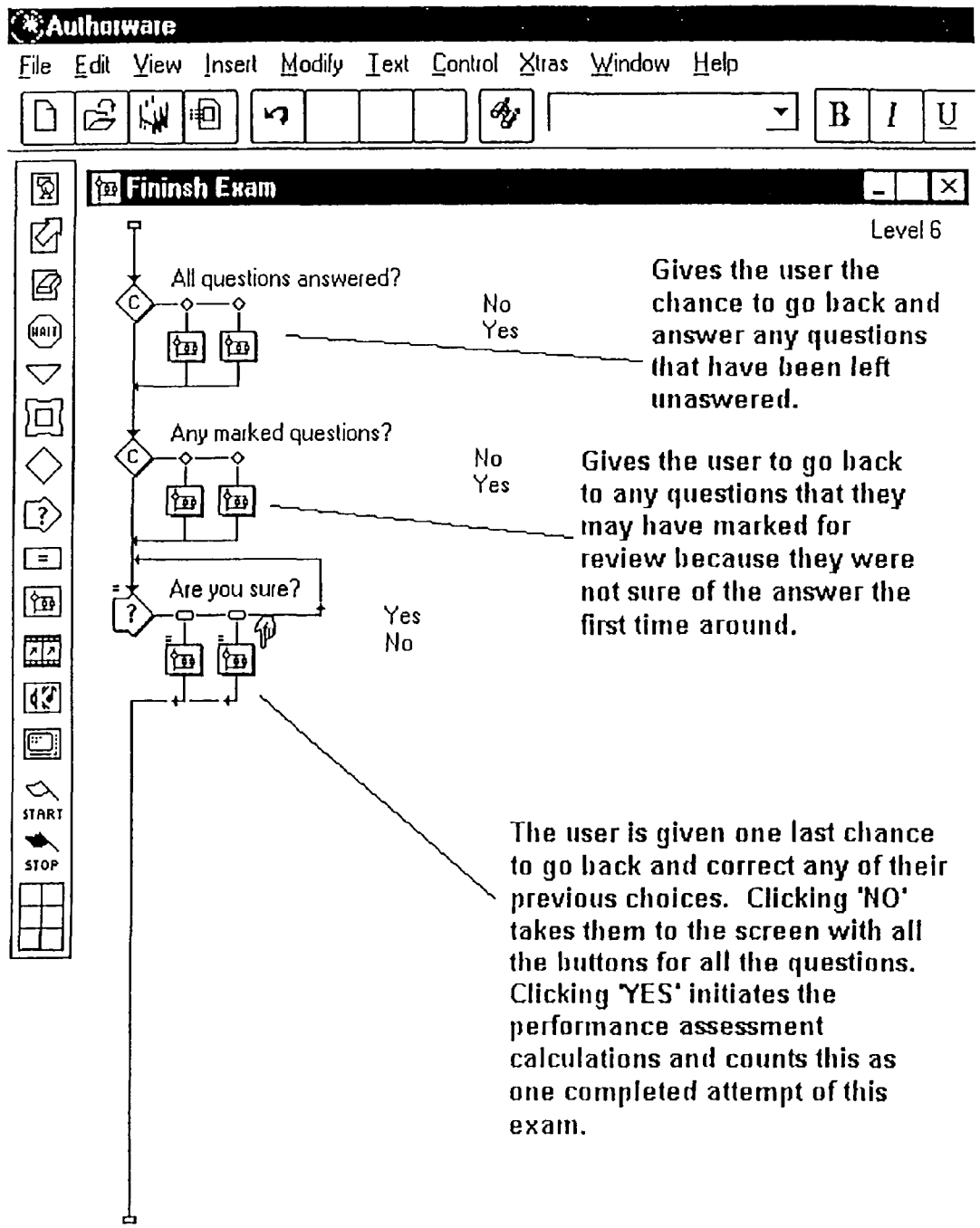
Figure 4T:
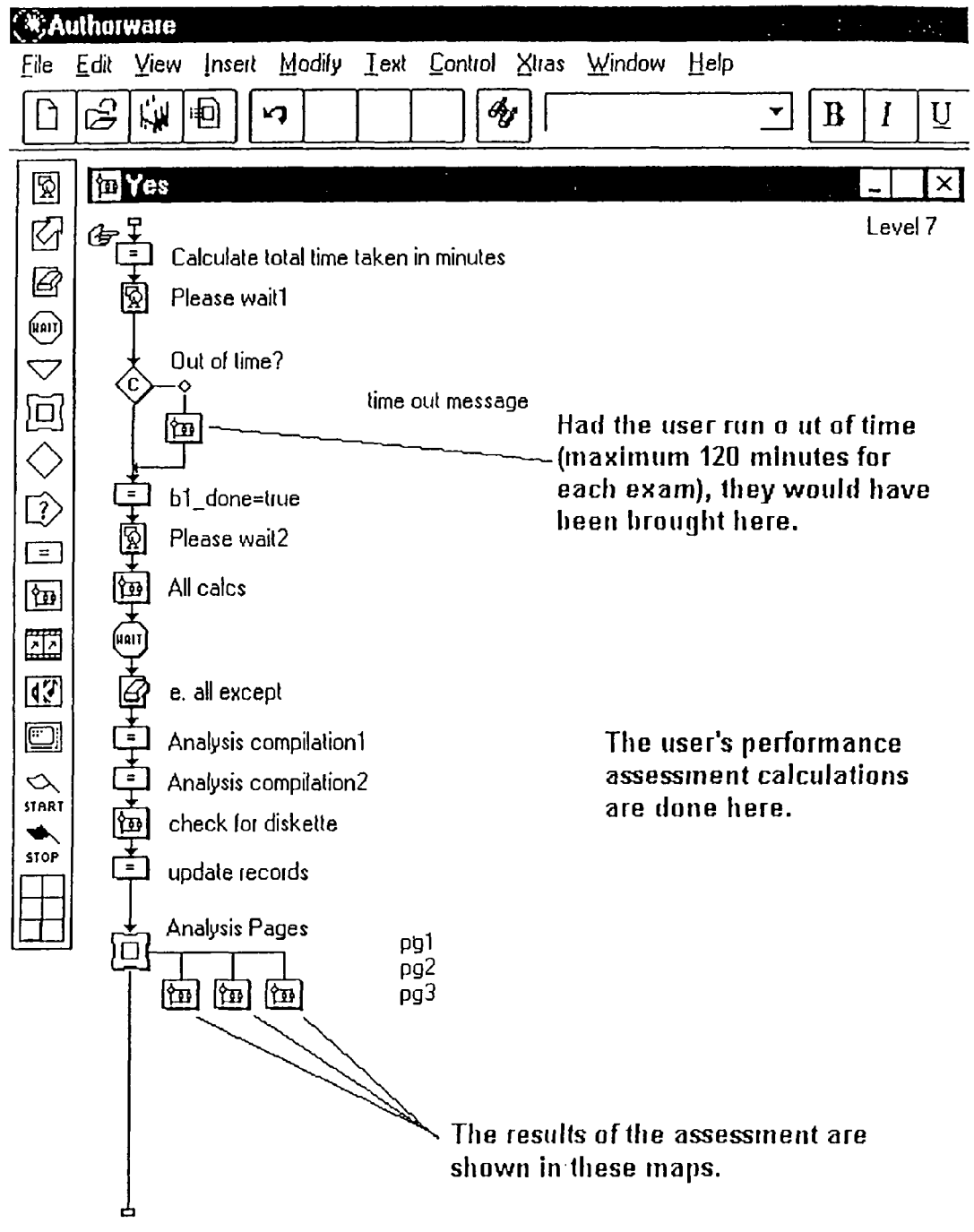
Figure 4U:
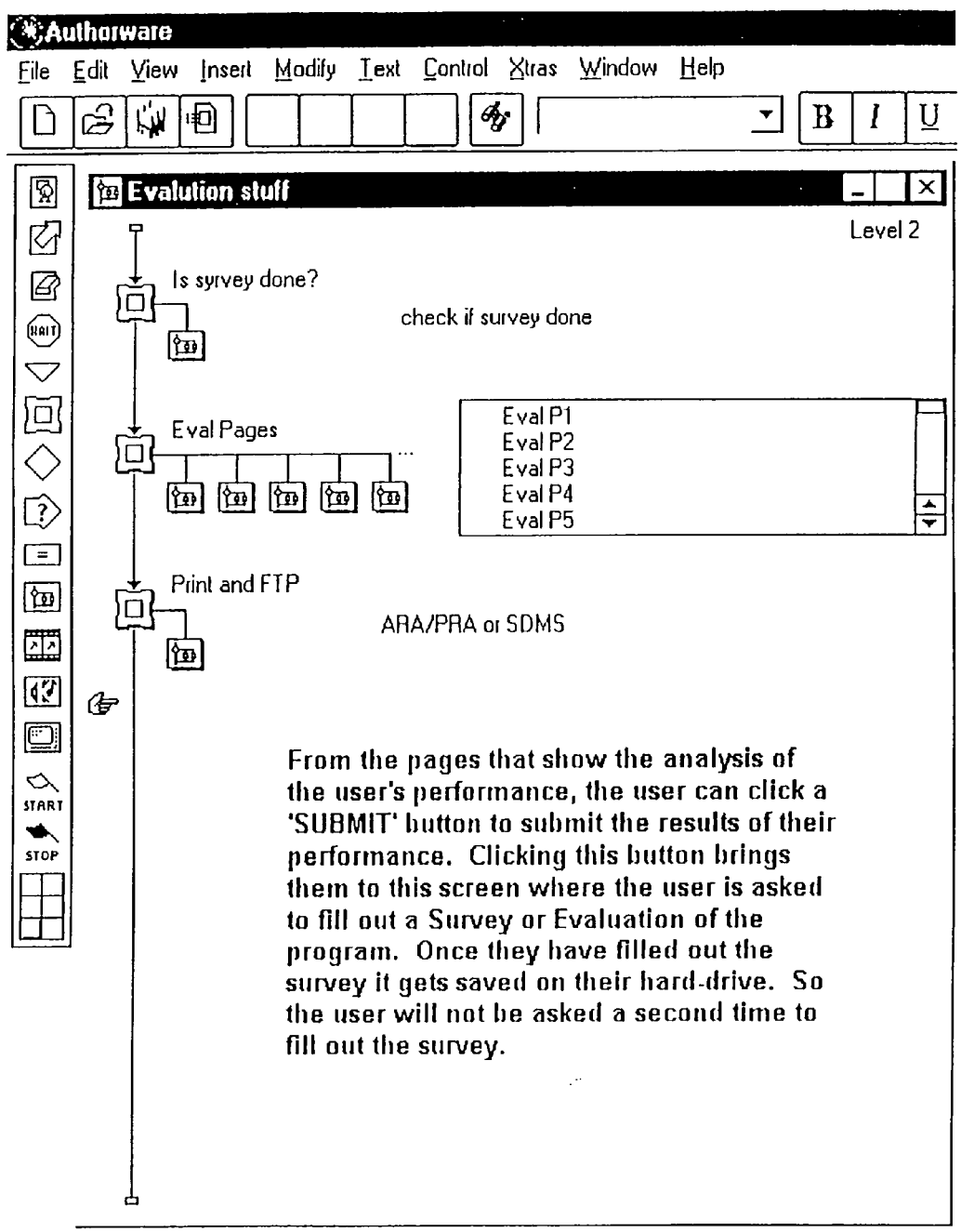
Figure 4V:
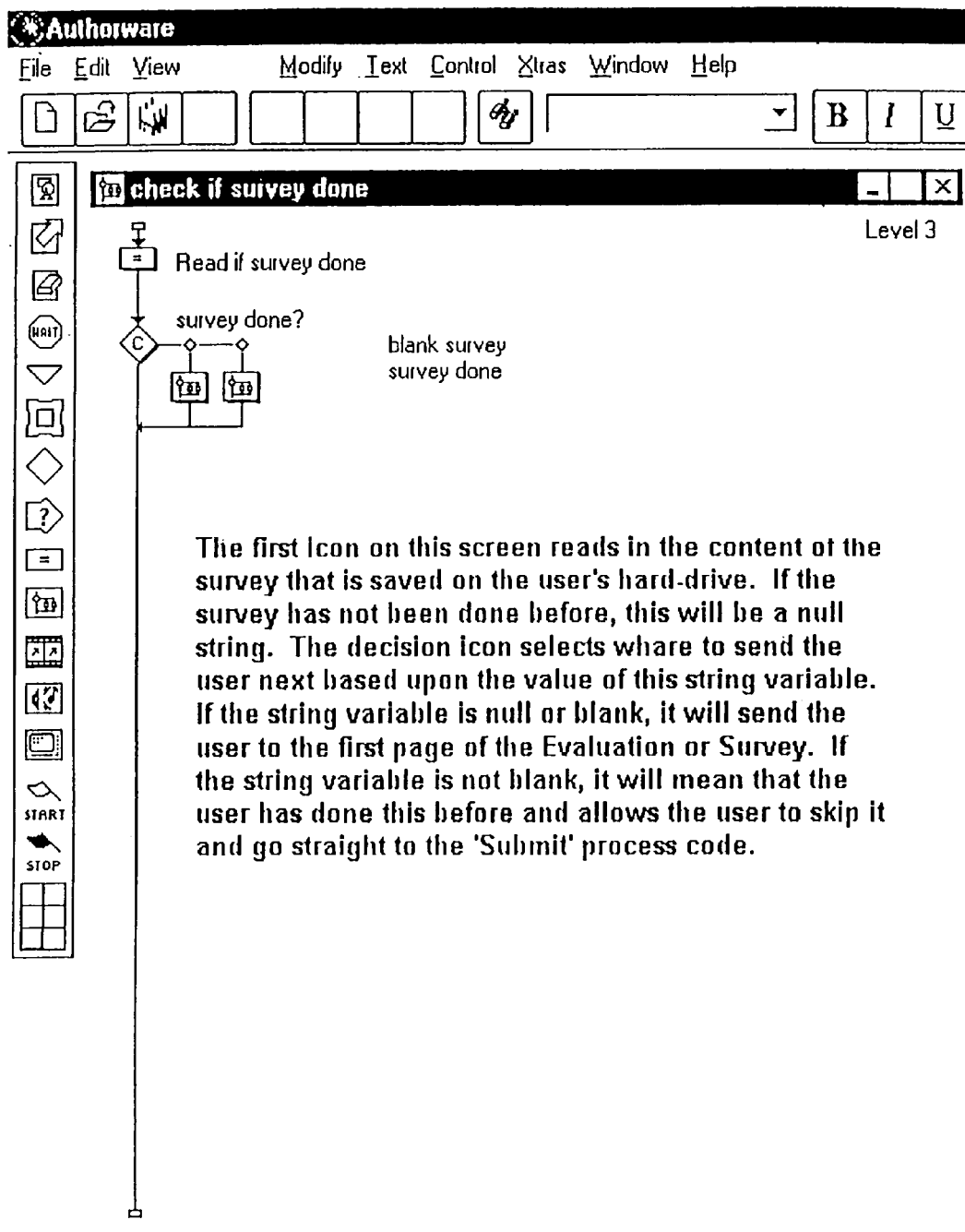
Figure 4W:
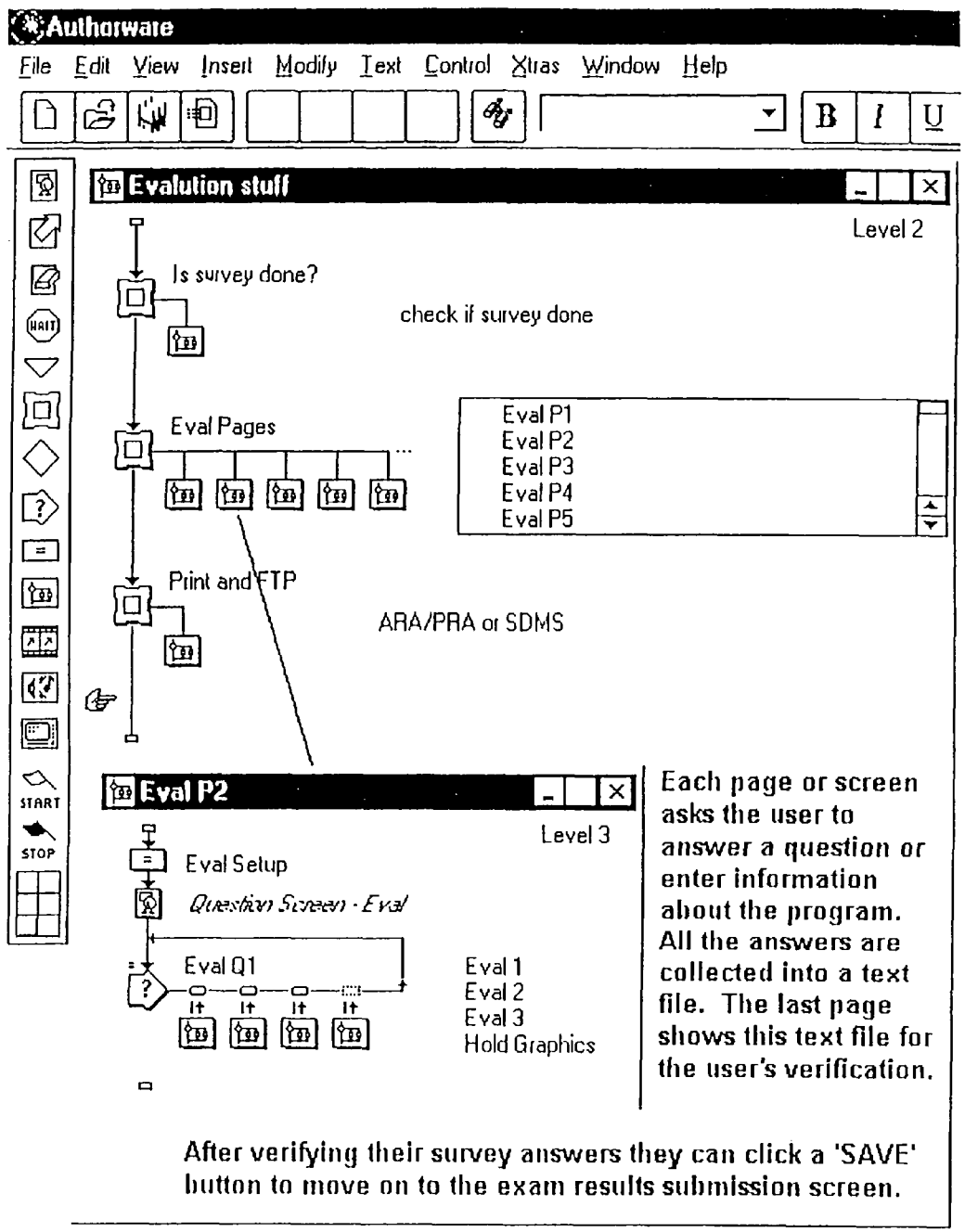
Figure 4X:
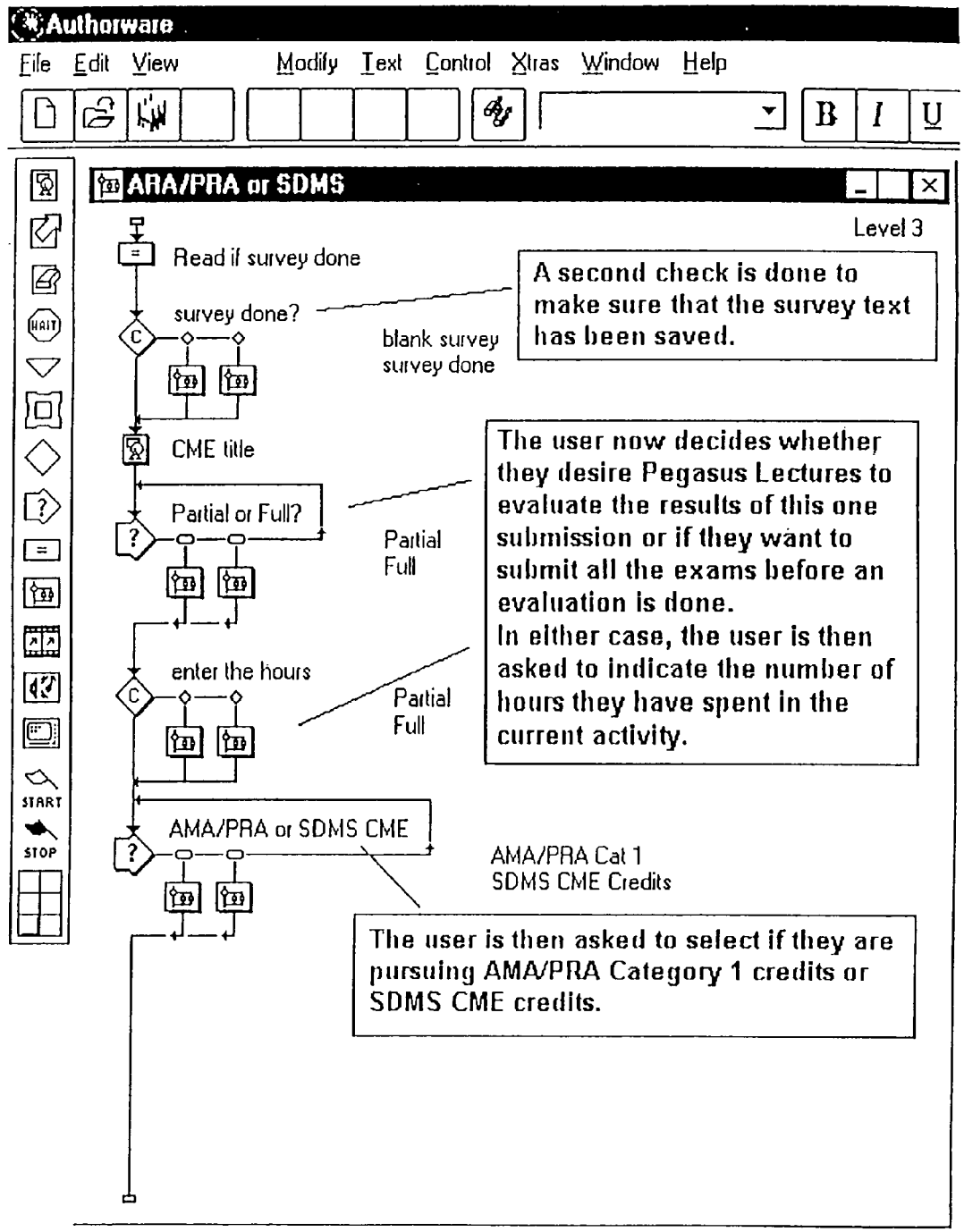
Figure 4Y:
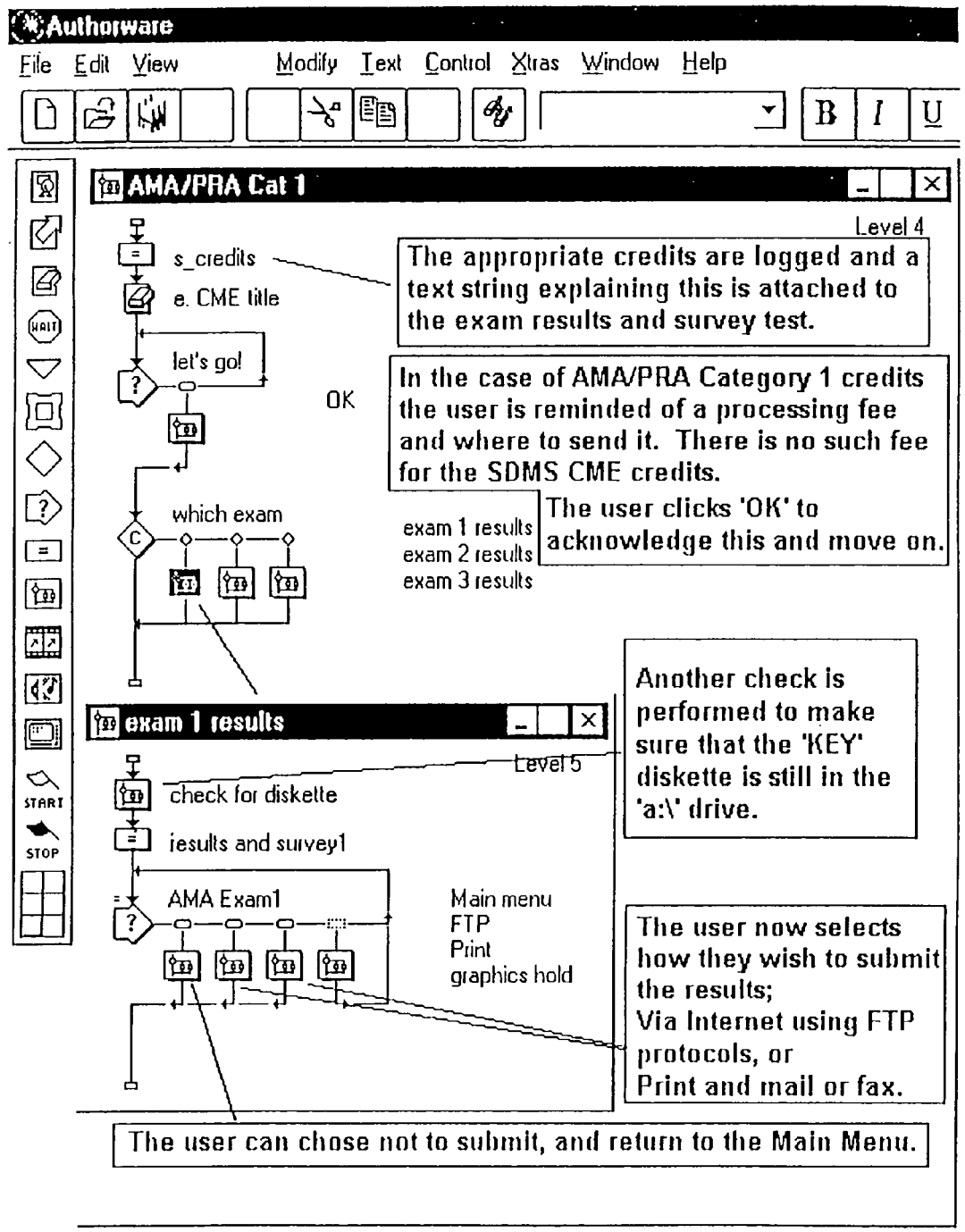

FIGS. 4a-4y represent one exemplary embodiment of the coding of the computer program of the invention, in the form of Authorware program flow and architecture charts. A listing of the Authorware icons or objects present in FIGS. 4a-4y is provided in FIG. 4z. It will be recognized, however, that other computer programs, program flows, and architectures may be used with equal success in rendering the fundamental methodologies and techniques of the present invention in a software environment; hence, the exemplary embodiment of FIGS. 4a-4z should in no way be considered limiting.

Figure 5:
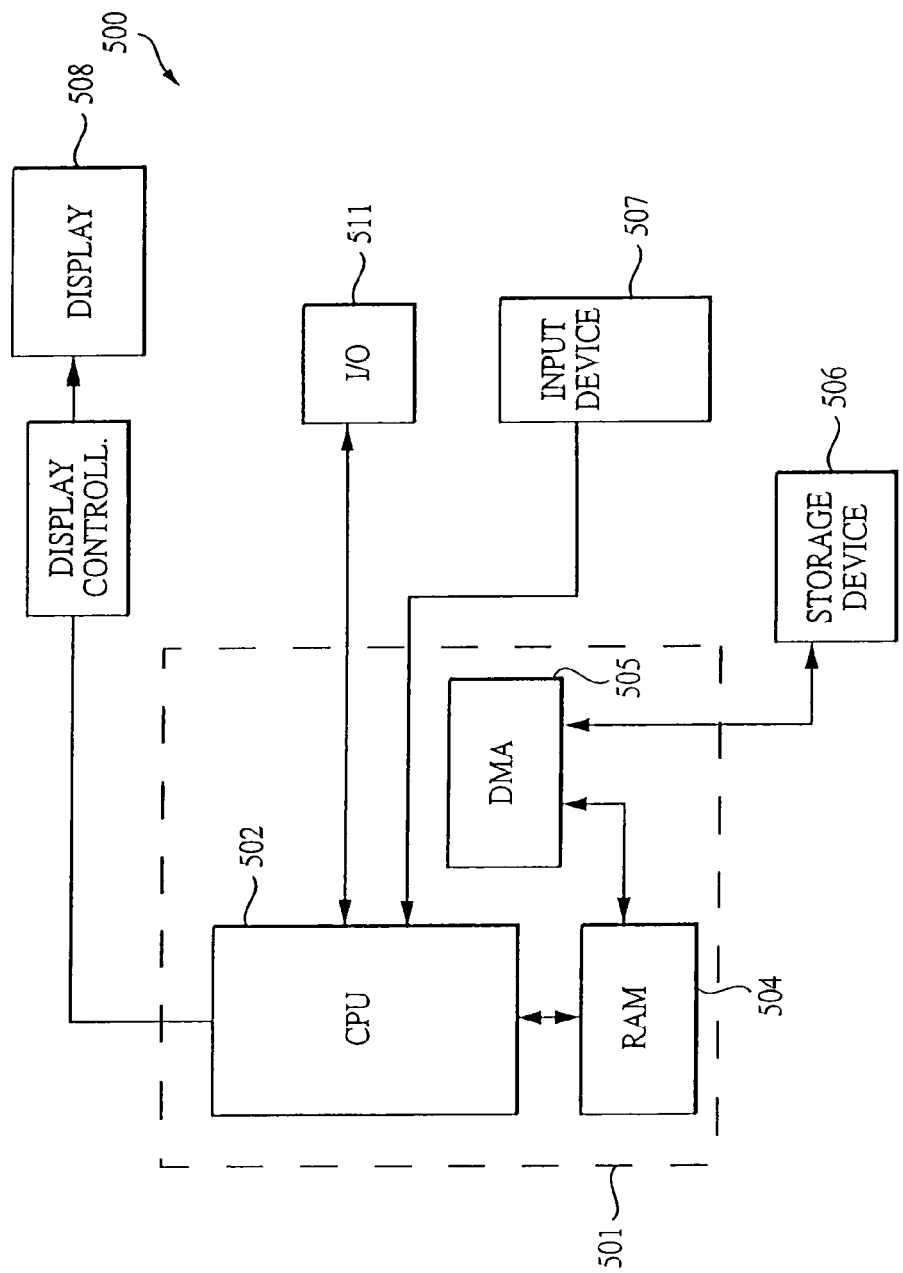
FIG. 5 is a functional block diagram illustrating one embodiment of the apparatus for encoding and evaluating according to the invention.

Referring now to FIG. 5, one embodiment of an apparatus capable of encoding and evaluating examination questions and related data as disclosed herein is described. The computing device 500 comprises a motherboard 501 having a central processing unit (CPU) 502, random access memory (RAM) 504, and memory controller (such as a direct memory access controller) 505. A storage device 506 (such as a hard disk drive or CD-ROM), input device 507 (such as a keyboard, mouse, optical unit and/or speech recognition apparatus), and display device 508 (such as a CRT, plasma, or TFT display), as well as buses necessary to support the operation of the host and peripheral components, are also provided. A serial (e.g., USB) or parallel I/O port 511 is also included for the transfer of data and/or control signals to and from the apparatus 500. As previously described, the apparatus may be coupled to a network or other communications interface, such as an IEEE 802.x Ethernet network, other LAN, WAN, SONET, ATM, internet, intranet, POTS, DSL, HFC (hybrid fiber-coax), cable, or other apparatus adapted to communicate data between or among a variety of nodes. Interfaces to the network may be wired (such as by using conductors), optically coupled, infrared, or even utilize a radio frequency wireless interface such as that complying with IEEE Std. 802.11, the "Bluetooth" 2.4 GHz protocol, or even time modulated ultra-wide bandwidth (TM-UWB) protocol.

The aforementioned computer program useful for encoding and evaluating is stored in the form of a machine-readable object code representation in the RAM 504 and/or storage device 506 for use by the CPU 502 during program operation. The user or exam administrator (not shown) selects one or more functional modes for the computer program and associated parametric measuring equipment (if any) via the program displays and the input device 507 during system operation. For example, the examinee may select options within the program menus structure which cause the program to generate an examination having a predetermined number of questions relating to a given topic, to fit within a predetermined time period, or to be administered at a predetermined rate, etc.

Other variables or settings as previously described herein (such as "adaptive" question generation, recommendation prompting, contextual "primer" displays, etc.) may also be selected. The computer program performs the previously described encoding, exam generation, and analysis, and displays the results for the user or other individual monitoring the examination. Such data generated by the program are also optionally stored in the storage device 506 for later retrieval, or output to an external device such as a printer, data storage unit, or other peripheral via a serial or parallel port 412 if desired. Furthermore, the apparatus 500 may be networked to another computing device or database via network interface card (NIC) or similar interface (not shown) whereby the data generated by the apparatus 500 may be remotely analyzed or stored.

In yet another embodiment, the apparatus comprises a personal computing device (such as a personal digital assistant, or PDA), which is adapted to receive input responses and data from the individual analyze the responses/data to evaluate their knowledge level. It will also be recognized that other portable devices, such as laptop computers, calculators, and personal organizers, may be configured to run the computer program of the present invention. Furthermore, a variety of different methods of transmitting the input sensor data to these devices may be used, including networked computers, or even wireless data links. The present invention further contemplates using portable devices which are provided to a plurality of individuals during an examination, the portable devices having for example the client portion of a distributed application (DA) as previously described which is linked to a server or master portion of the DA running on a central monitoring and administration node (not shown) such as by the aforementioned Bluetooth wireless interface. Hence, all examinees are provided identical devices which are directly linked to the master portion, thereby enabling the central node the ability to monitor exam progress and other useful parameters as previously described herein.

Figure 6:
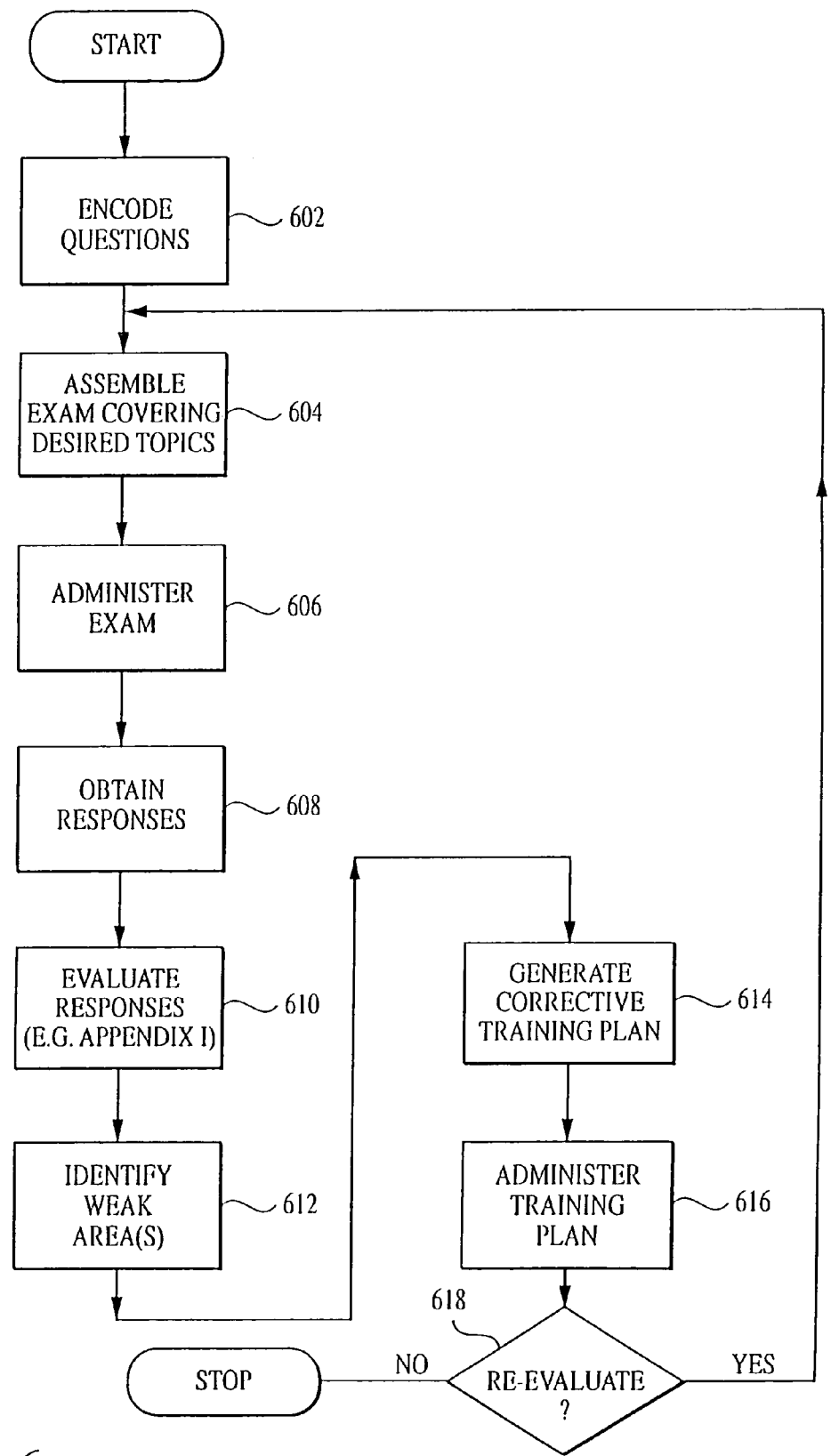
FIG. 6 is a logical flow diagram illustrating one embodiment of the method of educating or training an individual according to the invention.

Referring now to FIG. 6, the method of educating or training an individual using the aforementioned methods is now described. As shown in FIG. 6, the method 600 generally comprises first administering a sequence of encoded questions/responses to the individual(s) as previously described herein (step 602); evaluating the performance of the individual(s) using the responses to the encoded sequences of questions (step 604); identifying at least one are of weakness or potential improvement within the individual(s) (step 606); generating a training plan based on the at least one area of weakness (step 608); and administering the training plan to the individual(s) in order to increase their level of performance (step 610). Note that the methodology of FIG. 6 may be entirely automated and embodied within the aforementioned computer program using the techniques previously discussed. For example, in one exemplary embodiment, the computer program is adapted to (i) solicit requisite information from the individual(s) being tested (such as name, SSN, native language, desired subject matter to be tested, purpose of examination, desired duration, etc.); (ii) encode and assemble (or assemble from pre-encoded questions) an examination meeting the required input parameters; (iii) administer the examination to the individual through screen displays/prompts, synthesized audio/speech (such as through use of a text-to-speech (TTS) system of the type well known in the computer arts), braille character generation, or other methods: (iv) receive responses from the individual(s) via input device (e.g., keyboard, mouse, voice recognition algorithm, etc.), and potentially other parametric data; (v) analyze the responses (and parametric data if applicable) to identify areas of knowledge or other deficiency; (vi) generate a training plan, such as a new examination or series of instructional modules followed by short quizzes to test the level of assimilation of the material provided, for use by the individual(s); and (vii) administering the generated training plan via the same display/input/output devices previously used to administer the examination. In this fashion, the present invention is advantageously self-diagnosing and correcting; deficiencies identified in the individual(s) being tested are corrected through interactive training focused pointedly at the specific deficiencies identified for that particular individual (or group). This approach also increases the efficiency and reduces the cost with which material may be taught to the individual, since the feedback is immediate, and the lesson plan is spontaneously generated, thereby obviating much if not all supplemental instruction by a human instructor. The invention also allows the individual to tailor the instruction/testing environment to their particular needs, timing constraints, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Ultrasound Physics Question Categories (using hexadecimal 10=A, 11=B, etc)
Category 1: Math:
Sub-category 1: general mathematics
Sub-category 2: abbreviations (metric and exponential notation)
Sub-category 3: equation knowledge (knowing and applying equation)
Sub-category 4: linear and non-linear relationships (proportionality, inverse, exponential growth)
Sub-category 5: dimensional measurements (distance, area, volume)
Sub-category 6: binary
Sub-category 7: logarithms and decibels
Sub-category 8: distance equation
Sub-category 9: trigonometry
Category 2: Waves:
Sub-category 1: General Waves
Sub-category 2: Sound Waves
Sub-category 3: Frequency and Period
Sub-category 4: Propagation Speed
Sub-category 5: Wavelength
Sub-category 6: Amplitude
Sub-category 7: Power and Intensity
Sub-category 8: Distance Equation (applied)
Category 3: attenuation:
Sub-category 1: General Attenuation
Sub-category 2: Absorption
Sub-category 3: Reflection and Transmission percentages
Sub-category 4: Types of reflection
Sub-category 5: Refraction
Sub-category 6: Attenuation Rate
Sub-category 7: Contrast
Sub-category 8: Harmonics
Category 4: Pulsed wave
Sub-category 1: General
Sub-category 2: Pulse Duration
Sub-category 3: Spatial Pulse Length
Sub-category 4: PRP and PRF
Sub-category 5: Duty Factor
Sub-category 6: Common Intensities
Category 5: transducers
Sub-category 1: General Transducers
Sub-category 2: Single Crystal and Beam Dimensions
Sub-category 3: Focusing
Sub-category 4: Lateral resolution
Sub-category 5: Matching Layer and Acoustic Impedance
Sub-category 6: Backing Material, Bandwidth, and longitudinal Resolution
Sub-category 7: Wide Bandwidth
Sub-category 8: Transducer Types
Sub-category 9: Operating frequency
Sub-category A: Elevation Resolution
Sub-category B: Electronic Steering and Phasing
Category 6: System operation
Sub-category 1: General System
Sub-category 2: Receiver Functions and A/D Conversion
Sub-category 3: Scan Converters
Sub-category 4: Displays
Sub-category 5: Detail resolution
Sub-category 6: Contrast Resolution
Sub-category 7: Temporal resolution
Sub-category 8: Multiple Transmit Foci
Sub-category 9: Modalities
Sub-category A: Definitions (dynamic range, real time an post-processing)
Sub-category B: A/D and D/A converters
Category 7: Doppler
Sub-category 1: General Theory and Doppler Equation
Sub-category 2: Sensitivity
Sub-category 3: Angular affects
Sub-category 4: Wall filters
Sub-category 5: Display and processing
Sub-category 6: Nyquist and PRF
Sub-category 7: PW vs CW and HPRF
Sub-category 8: Spectrum interpretation
Sub-category 9: Color Doppler theory
Sub-category 10: Color Frame rate, PRF and temporal resolution
Sub-category 11: Color Flow Direction
Category 8: artifacts
Sub-category 1: General Artifacts
Sub-category 2: Temporal resolution
Sub-category 3: lateral resolution
Sub-category 4: longitudinal resolution
Sub-category 5: Contrast resolution
Sub-category 6: reverberation
Sub-category 7: Mirror image
Sub-category 8: Shadowing and enhancement Sub-category 9: Grating lobes and sidelobes
Sub-category 10: speed error
Sub-category 11: Multi-path
Sub-category 12: Aliasing and Doppler related
Category 9: bioeffects
Sub-category 1: General and Bioeffect Definitions
Sub-category 2: Common Intensities
Sub-category 3: Bioeffect Limits
Category 10(A): safety and quality assurance
Sub-category 1: General Safety and Quality
Sub-category 2: Test Objects and Phantoms
Sub-category 3: Statistical Indices
Category 11(B): arterial hemodynamics
Sub-category 1: Definitions and general
Sub-category 2: Resistance equation
Sub-category 3: Volumetric flow equation
Sub-category 4: Simplified law of hemodynamics
Sub-category 5: Poiseuille's law
Sub-category 6: Bernoulli's equation
Sub-category 7: Effects of stenoses
Sub-category 8: Flow characteristics
Category 12(C): venous hemodynamics
Sub-category 1: General
Sub-category 2: Hydrostatic Pressure
Sub-category 3: Calf muscle pump
Sub-category 4: Respiratory effects
Sub-category 5: Transmural Pressure Question Types: ($m_x$)

1 General Math concepts
2 Calculations with no formal equations
3 Calculation based on equations and mathematical relationships
4 Ordering (increasing, decreasing progressions)
5 Definitions and memorization
6 Application of physics concepts to ultrasound
7 Application of definitions and concepts to general situations
8 Relating multiple concepts together
9 Basic principles and concepts
10 (A) Inversion (all true except, which of the following is not)
11 (B) Contain unrelated and/or extra information
12 (C) Require extra careful reading
(sample of Analysis: Page 1)

Ultrasound Physics and Instrumentation Examination Score Report

| Section | Your Score | Maximum Possible Score | Percent correct |
|---|---|---|---|
| Mathematics | 8 | 10 | 80% |
| Waves | 14 | 20 | 70% |
| Attenuation | 8 | 10 | 80% |
| Pulsed Wave | 9 | 10 | 90% |
| Transducers | 14 | 25 | 56% |
| System Operation | 4 | 10 | 40% |
| Doppler | 8 | 9 | 89% |
| Artifacts | 7 | 11 | 64% |
| Bioeffects | 9 | 12 | 67% |
| Safety and Quality Assurance | 2 | 3 | 67% |
| Total | 83 | 120 | 69% |

Summary

Correct Responses:
You must have answered 84 questions correctly to pass.
You answered 83 questions correctly. You did not pass the examination.
Time:
You finished the exam in 118 minutes
Of the 118 minutes you spent 13 minutes reviewing "marked" questions.
You are completing the exam at an appropriate pace
Changing your initial response:
You changed your initial response 7 times.
Of the 7 changes:
    Right to wrong changes: 4 times
    Wrong to right changes: 2 times
    Wrong to wrong changes: 1 time
    If you had not changed any response your score would have been 85 correct (we suggest that you not change from your initial response)
Areas of difficulty:
The areas in which you had the most difficulty were:
    System operation
    Transducers
    Artifacts
Specifically, you had the most difficulty with questions which:
    contained unrelated and/or extra information
    require careful reading
    calculation based on equations and mathematical relationships
    calculations with no formal equations
    relating multiple concepts together
(sample of Analysis: Page 2)
USE OF VARIABLES:
Correct=CSP %,
Overall Correct=CCP %,
Overall: For the X . . . , X=CCT,
Level of Difficulty from table 1,
Time per question=avg_sub_cat_time($i_x$)
Overall Time per question=avg_cat_time($i_x$)

Comprehensive Analysis
Analysis of Exam Topic Knowledge

| Mathematics | Correct | Level of difficulty | Time per question |
|---|---|---|---|
| general mathematics | 93% | No difficulty | 65 seconds |
| abbreviations (metric and exponential notation) | 86% | Mild difficulty | 35 seconds |
| equation knowledge (knowing and applying equation) | 57% | Significant difficulty | 68 seconds |
| Linear & non-linear relationships (proportionality, inverse. exponential) | 70% | Moderate difficulty | 72 seconds |
| dimensional measurements (distance, area, volume) | 95% | No difficulty | 40 seconds |
| binary | 20% | Critical difficulty | 94 seconds |
| logarithms and | 12% | Critical difficulty | 96 seconds |
| decibels | 20% | Critical difficulty | 96 seconds |
| distance equation | 100% | No. Difficulty | 40 seconds |
| trigonometry | 84% | Mild difficulty | 59 seconds |
| Overall: For the 17 questions which involved mathematics | 82% | Mild difficulty | 74 seconds |

| Waves | Correct | Level of difficulty | Time per question |
|---|---|---|---|
| General Waves | 96% | No difficulty | 36 seconds |
| Sound Waves | 82% | Mild difficulty | 35 seconds |
| Frequency and Period | 43% | Significant difficulty | 41 seconds |

-continued

Comprehensive Analysis
Analysis of Exam Topic Knowledge

| | | | |
|---|---|---|---|
| Propagation Speed | 66% | Moderate difficulty | 39 seconds |
| Wavelength | 100% | No difficulty | 75 seconds |
| Amplitude | 20% | Critical difficulty | 39 seconds |
| Power and Intensity | 84% | Mild difficulty | 48 seconds |
| Distance Equation (applied) | 20% | Critical difficulty | 65 seconds |
| Overall: For the 14 questions which involved waves | 72% | Moderate difficulty | 41 seconds |

. . .

(sample of Analysis: Page 3)
USE OF VARIABLES:
Correct=CQP %,
Level of Difficulty from table 1,
Time per question=avg_qtype_time($m_x$)
Overall Correct=Overall Correct %
Overall Time per question=avg_q_time)

Analysis of Exam Question Types

| Question Type | Correct | Level of difficulty | Time per question |
|---|---|---|---|
| General Math concepts | 84% | Mild difficulty | 65 seconds |
| Calculations with no formal equations | 46% | Critical difficulty | 35 seconds |
| Calculation based on equations and mathematical relationships | 35% | Critical difficulty | 68 seconds |
| Ordering (increasing, decreasing progressions) | 90% | Mild difficulty | 42 seconds |
| Definitions and memorization | 95% | No difficulty | 40 seconds |
| Application of physics concepts to ultrasound | 96% | No difficulty | 94 seconds |
| Application of definitions and concepts to general situations | 84% | Mild difficulty | 96 seconds |
| Relating multiple concepts together | 63% | Significant difficulty | 96 seconds |
| Basic principles and concepts | 96% | No Difficulty | 40 seconds |
| Inversion (all true except. which of the following is not) | 84% | Mild difficulty | 39 seconds |
| Contain unrelated and/or extra information | 17% | Critical Difficulty | 44 seconds |
| Require careful reading | 18% | Critical Difficulty | 30 seconds |
| Overall Exam | 69% | Moderate difficulty | 55 seconds |

Calculations for analysis
Question Format:
($i_x$, $j_x$, $k_x$, $l_x$, $m_x$)
$i_x$: Principal topic categories
$j_x$: Principal topic sub-categories
$k_x$: Secondary topic categories
$l_x$: Secondary topic sub-categories
$m_x$: Question type
C(x)=Correct response of type x
T(x)=Total number of questions of type x
Time(x)=Time for all questions of type x
    Exam Score $$\text{Overall Correct} = \frac{C(x)}{T(X)}$$

Question type calculations (CQP):

$$\text{Correct Question Percentage} = \frac{\sum_x C(m_x)}{\sum_x T(m_x)}$$

Category (Topic) calculations (CCP):

$$\text{Correct Category Percentage}(x) = \frac{2 * \sum_{x,j_x=1}^{F} C(i_x, j_x) + 1 * \sum_{x,l_x=1}^{F} C(k_x, l_x)}{2 * \sum_{x,j_x=1}^{F} T(i_x, j_x) + 1 * \sum_{x,l_x=1}^{F} T(k_x, l_x)}$$

Sub-category (topic) calculations (CSP):

$$\text{Correct Sub-category Percentage}(x) = \frac{\sum_x C(i_x, j_x) + \sum_x C(k_x, l_x)}{\sum_x T(i_x, j_x) + \sum_x T(k_x, l_x)}$$

Category (topic) Total (CCT):

$$\text{Correct Category Total}(x) = \sum_{x,j_x=1}^{F} T(i_x, j_x) + \sum_{x,l_x=1}^{F} T(k_x, l_x)$$

Category (topic) Total (CST):

$$\text{CorrectSub\_Category Total}(x) = \sum_x T(i_x, j_x) + \sum_x T(k_x, l_x)$$

Question Type Total (QTT):

$$\text{Question Type Total}(x) = \sum_x T(m_x)$$

TABLE 1

(Level of Difficulty):

| | |
|---|---|
| If Correct % = 0 – 50% or totaltime$_x$ > 60 seconds: | Print: critical difficulty |
| 50 – 65% | Print: significant difficulty |
| 65 – 80% | Print: moderate difficulty |
| 80 – 90% | Print: mild difficulty |
| 90 – 100% | Print: little difficulty |
| 100% | Print: no difficulty |

Time Considerations

Firstpasstime$_x$=time spent answering a question (in minutes)

Reviewtime$_x$=time reviewing a marked question (in minutes)

Totaltime$_x$=Firstpasstime$_x$+Reviewtime$_x$(in minutes)

avg_cat_time(CCT(x))=average time spent on questions of specific category (in seconds)

avg_sub_cat_time(CST(x))=average time spent on questions of specific sub-category (in seconds)

avg_qtype_time(QTT(x))=average time spent on questions of specific question type (in seconds)

avg_q_time=average time spent per exam question (in seconds)

What is claimed is:

1. A method of encoding a question, comprising:
providing at least one question relating to at least one topic;
encoding said at least one question using a first parameter, the first parameter being related to a first area of said at least one topic;
encoding said at least one question using at least a second parameter, said at least second parameter being related to a second area of said at least one topic, said second area not being a subset of said first area; and
storing said at least one question in a computer readable apparatus comprising a storage medium subsequent to said acts of encoding.

2. The method of claim 1, further comprising encoding said at least one question using a third parameter, wherein said first parameter comprises a primary topic category; said second parameter a secondary topic category; and said third parameter a primary topic sub-category.

3. The method of claim 2, further comprising encoding said at least one question using fourth and fifth parameters, said fourth parameter comprising a secondary topic sub-category, and said fifth parameter comprising question type classification.

4. The method of claim 1, further comprising encoding said at least one question using a third parameter comprising question type classification.

5. The method of claim 1, wherein said acts of encoding comprise assigning a multi-digit code to said at least one question, each of said digits corresponding to respective ones of said parameters, the value of each of said digit representing a particular type of parameter.

6. The method of claim 4, wherein said acts of encoding comprise assigning a multi-digit code to said at least one question, each of said digits corresponding to respective ones of said parameters, the value of each of said digit representing a particular type of parameter.

7. The method of claim 1, further comprising analyzing the responses by at least one individual to said at least one question based at least in part on said acts of encoding.

8. The method of claim 7, wherein said at least one question comprises a plurality of questions, said method further comprising determining statistics indicative of the performance of said at least one individual based at least in part on said responses.

9. The method of claim 8, wherein said statistics are determined for said at least one individual during an examination.

10. The method of claim 1, further comprising encoding said at least one question using a third parameter relating to the administration of at least said at least one question.

11. The method of claim 10, wherein said act of encoding said third parameter comprises encoding using a parameter selected from the group consisting of: (i) the amount of time taken in responding to said at least one question; (ii) the amount of time re-reviewing said at least one question; (iii) the number of times each response is changed, (iv) the number of "right-to-wrong" answer changes; (v) the number of "wrong-to-right" answer changes; (vi) the number of "wrong-to-wrong" changes; and (vii) the sequence of question types presented.

12. A method of encoding a question, comprising:
providing a question relating to at least one topic;
encoding said question using a first parameter, the first parameter being related to a first primary category related to said at least one topic; and
encoding said question using a second parameter, said second parameter being related to a first sub-category of said at least one topic;
encoding said question using a third parameter, the third parameter being related to a second primary category related to said at least one topic;
encoding said question using a fourth parameter, said fourth parameter being related to a second sub-category of said at least one topic;
encoding said question based on its type;
encoding at least a portion of the allowed responses associated with said question, said encoding of said at least portion of said responses allowing evaluation of a user based at least in part thereon; and
storing said question and said allowed responses associated with said question in a computer readable apparatus comprising a storage medium.

13. The method of claim 12, wherein at least a portion of said encodings are binary.

14. The method of claim 12, wherein at least a portion of said encodings are hexadecimal.

15. The method of claim 14, wherein said hexadecimal encodings collectively comprise five digits.

16. The method of claim 12, wherein at least one of said acts of encoding comprises encoding using a parameter selected from the group consisting of: (i) the amount of time taken in responding to said at least one question; (ii) the amount of time re-reviewing said at least one question; (iii) the number of times each response is changed, (iv) the number of "right-to-wrong" answer changes; (v) the number of "wrong-to-right" answer changes; (vi) the number of "wrong-to-wrong" changes; and (vii) the sequence of question types presented.

17. A method of encoding a question, comprising:
providing a question relating to at least one topic;
encoding said question using a first parameter, the first parameter being related to a first area of said at least one topic;
encoding said question using a second parameter, said second parameter being related to a second area of said at least one topic, said second area not being a subset of said first area; and
storing said question in a computer readable apparatus comprising a storage medium as part of a testing regime, said testing regime useful in testing the knowledge level of at least one user.

* * * * *